(12) United States Patent
Nagatomi

(10) Patent No.: US 8,054,733 B2
(45) Date of Patent: Nov. 8, 2011

(54) OPTICAL PICKUP DEVICE

(75) Inventor: Kenji Nagatomi, Kaizu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/708,071

(22) Filed: Feb. 18, 2010

(65) Prior Publication Data

US 2010/0208569 A1 Aug. 19, 2010

(30) Foreign Application Priority Data

Feb. 19, 2009 (JP) .................................. 2009-036119

(51) Int. Cl.
*G11B 7/135* (2006.01)
(52) U.S. Cl. ............................... 369/112.03; 369/112.17
(58) Field of Classification Search .......................... None
See application file for complete search history.

(56) References Cited

U.S. PATENT DOCUMENTS

| | | | |
|---|---|---|---|
| 6,839,313 B2 * | 1/2005 | Araki et al. ............... | 369/112.01 |
| 7,539,090 B2 * | 5/2009 | Kadowaki et al. ......... | 369/44.28 |
| 2008/0117724 A1 * | 5/2008 | Okamoto ..................... | 369/13.3 |
| 2008/0247298 A1 * | 10/2008 | Ogata ....................... | 369/112.23 |
| 2009/0052304 A1 * | 2/2009 | Itoh et al. ................. | 369/112.23 |
| 2009/0201787 A1 * | 8/2009 | Ogasawara et al. ...... | 369/112.23 |
| 2009/0323501 A1 * | 12/2009 | Yanagawa et al. ........ | 369/112.03 |
| 2010/0214903 A1 * | 8/2010 | Nakai ....................... | 369/112.23 |

FOREIGN PATENT DOCUMENTS

| | | |
|---|---|---|
| JP | 2624255 B2 | 4/1997 |
| JP | 2006-294075 A | 10/2006 |
| JP | 2006-344344 A | 12/2006 |
| JP | 2008-130152 A | 6/2008 |

* cited by examiner

*Primary Examiner* — Hoa T Nguyen
*Assistant Examiner* — Emily Frank
(74) *Attorney, Agent, or Firm* — Ditthavong Mori & Steiner, P.C.

(57) ABSTRACT

An optical pickup device has an astigmatism element, a polarization setting element, and a polarizer. The astigmatism element converges laser light reflected on a disc in a first direction and a second direction to form a first focal line and a second focal line. The polarization setting element makes polarization directions of light fluxes different from each other, the light fluxes being obtained by dividing a light flux of the laser light transmitted through the astigmatism element into two by a straight line parallel to the first direction. The polarizer transmits light having polarization directions obtained by inverting the polarization directions set by the polarization setting element with respect to the straight line parallel to the first direction, respectively.

6 Claims, 18 Drawing Sheets

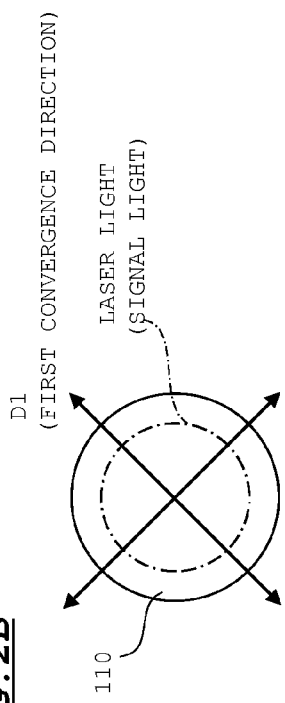
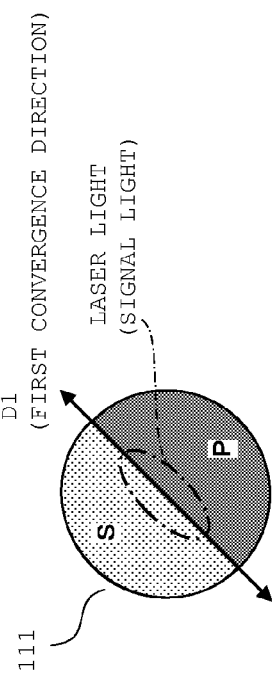
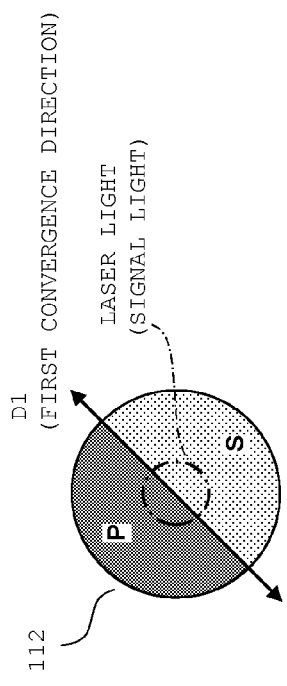
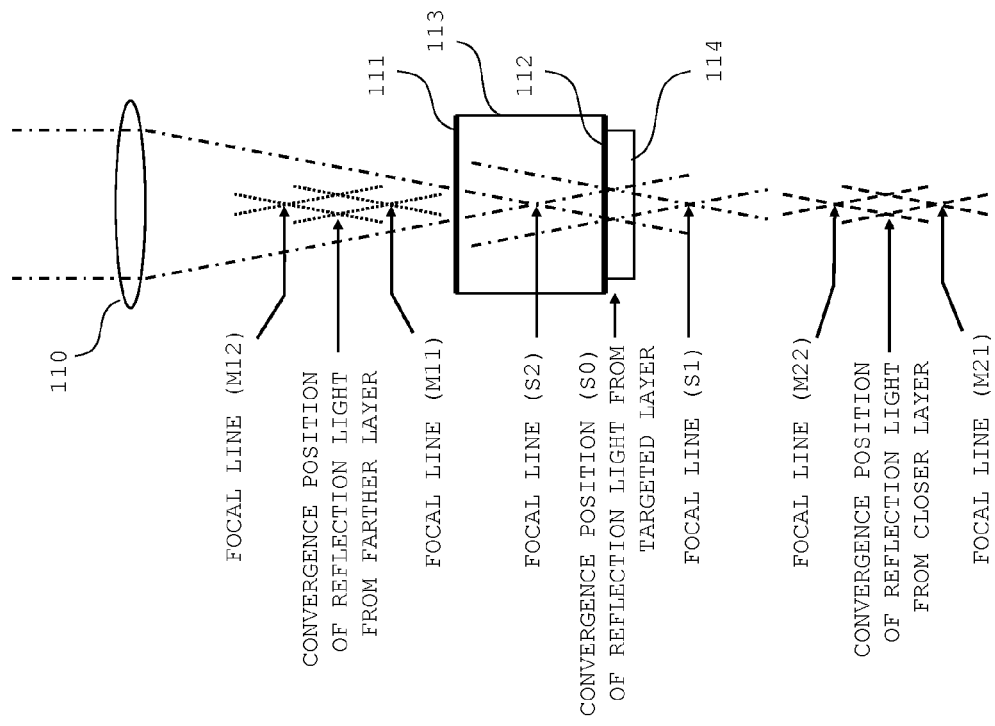

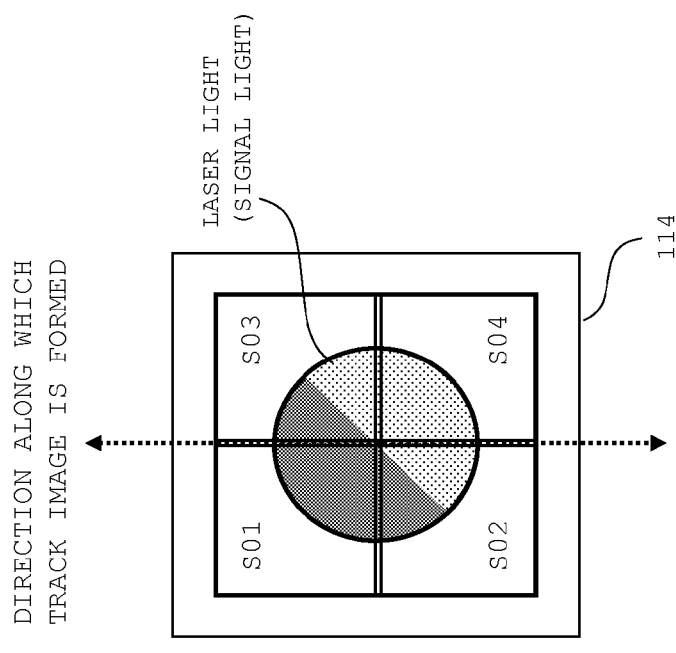

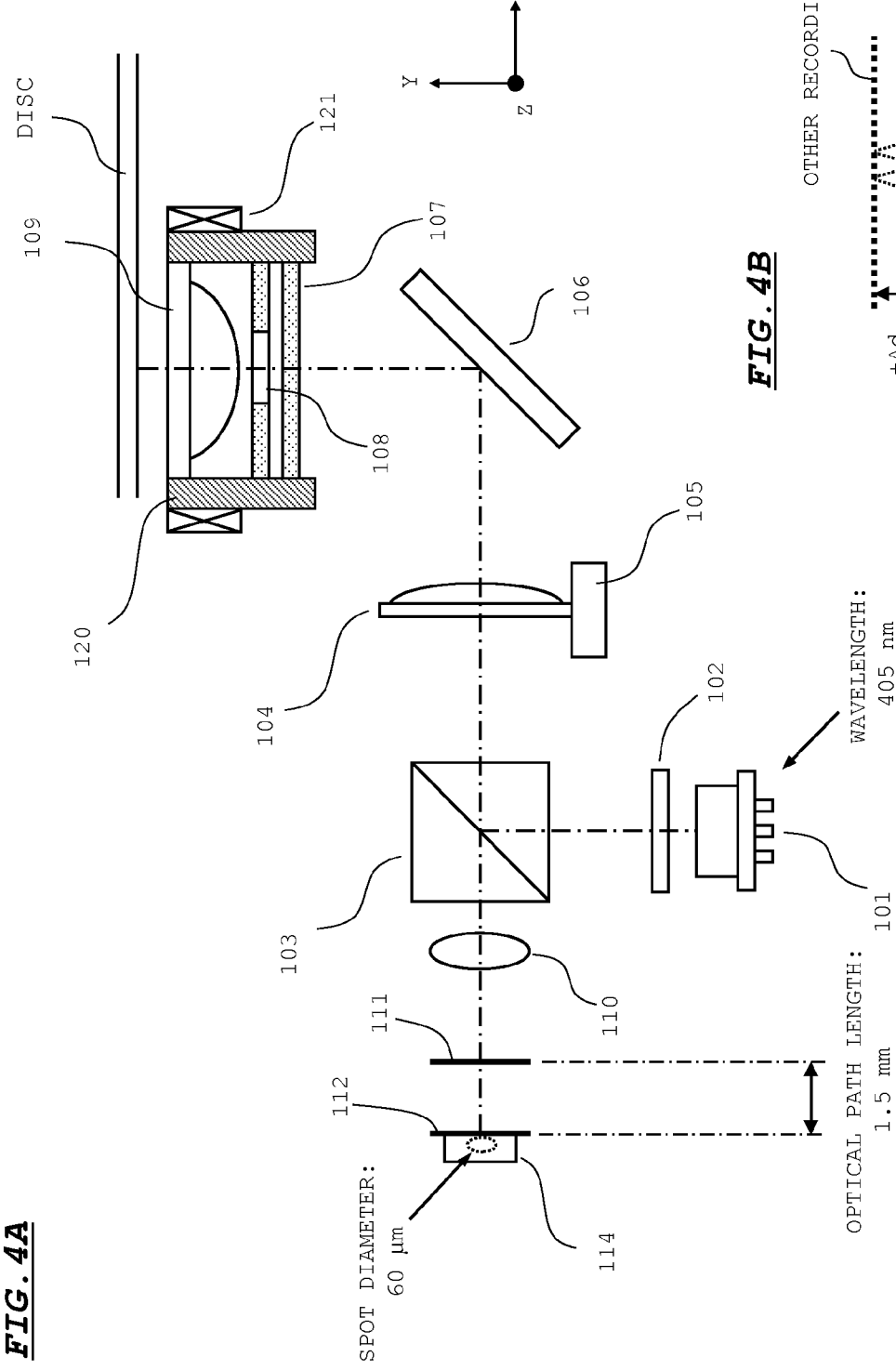
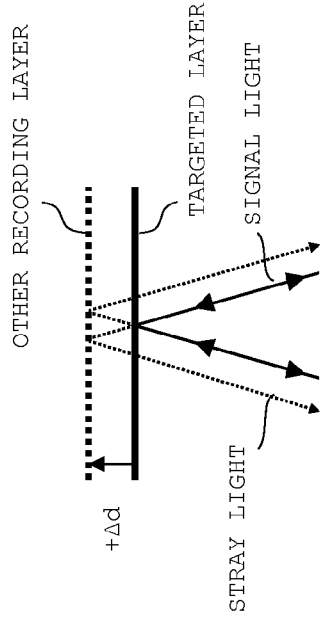
FIG. 4A
FIG. 4B

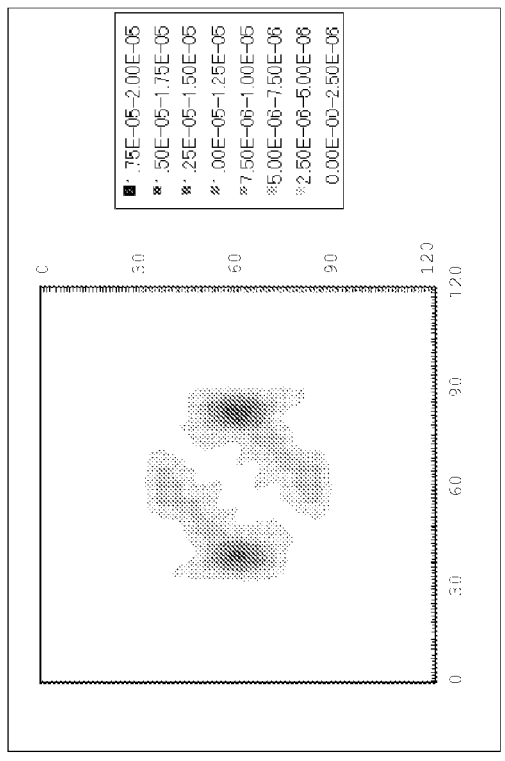
FIG.5B INTENSITY DISTRIBUTION OF SIGNAL LIGHT (WHEN SIGNAL LIGHT IS FOCUSED)
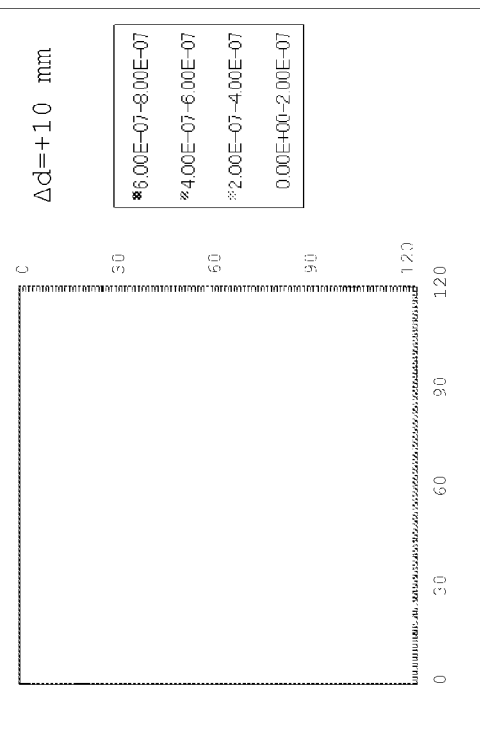
FIG.5D INTENSITY DISTRIBUTION OF STRAY LIGHT (WHEN SIGNAL LIGHT IS FOCUSED)
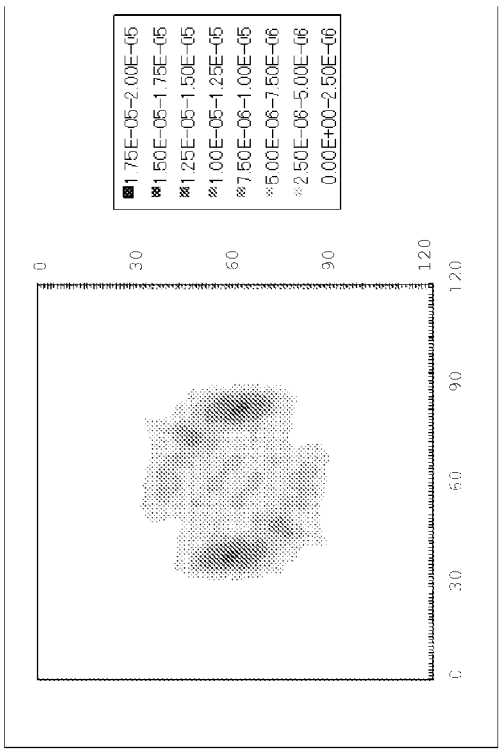
FIG.5A INTENSITY DISTRIBUTION OF SIGNAL LIGHT (WHEN SIGNAL LIGHT IS FOCUSED)
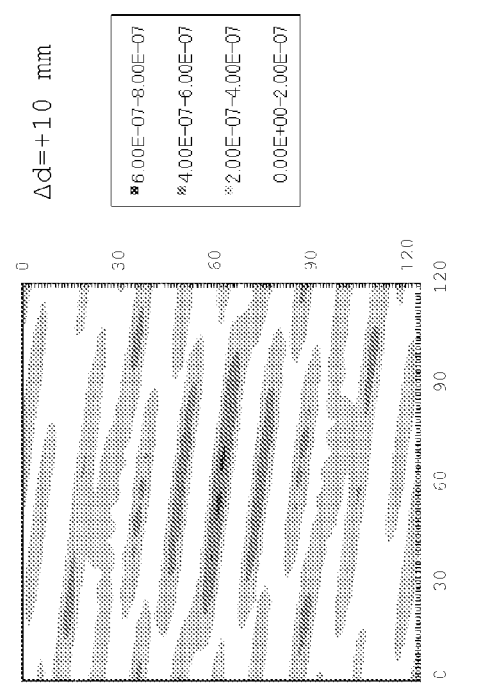
FIG.5C INTENSITY DISTRIBUTION OF STRAY LIGHT (WHEN SIGNAL LIGHT IS FOCUSED)

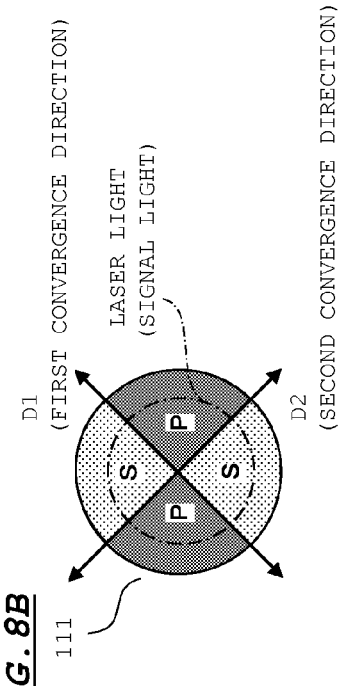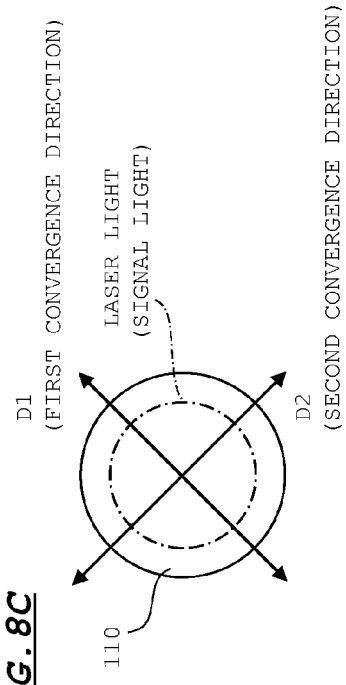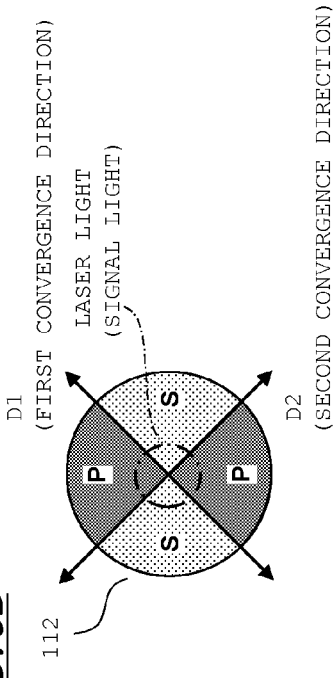
*FIG.8B* *FIG.8C* *FIG.8D*
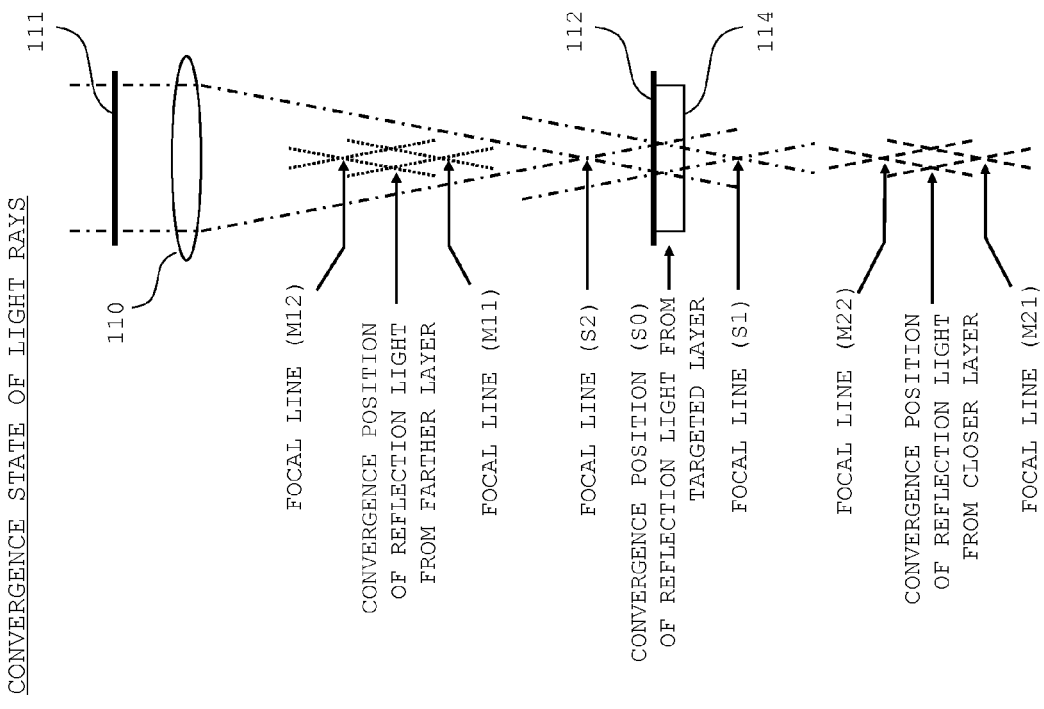
*FIG.8A*

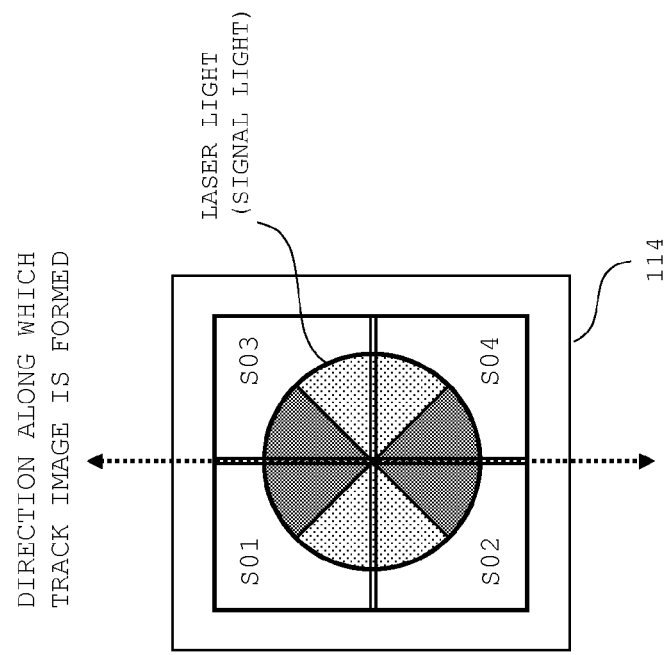
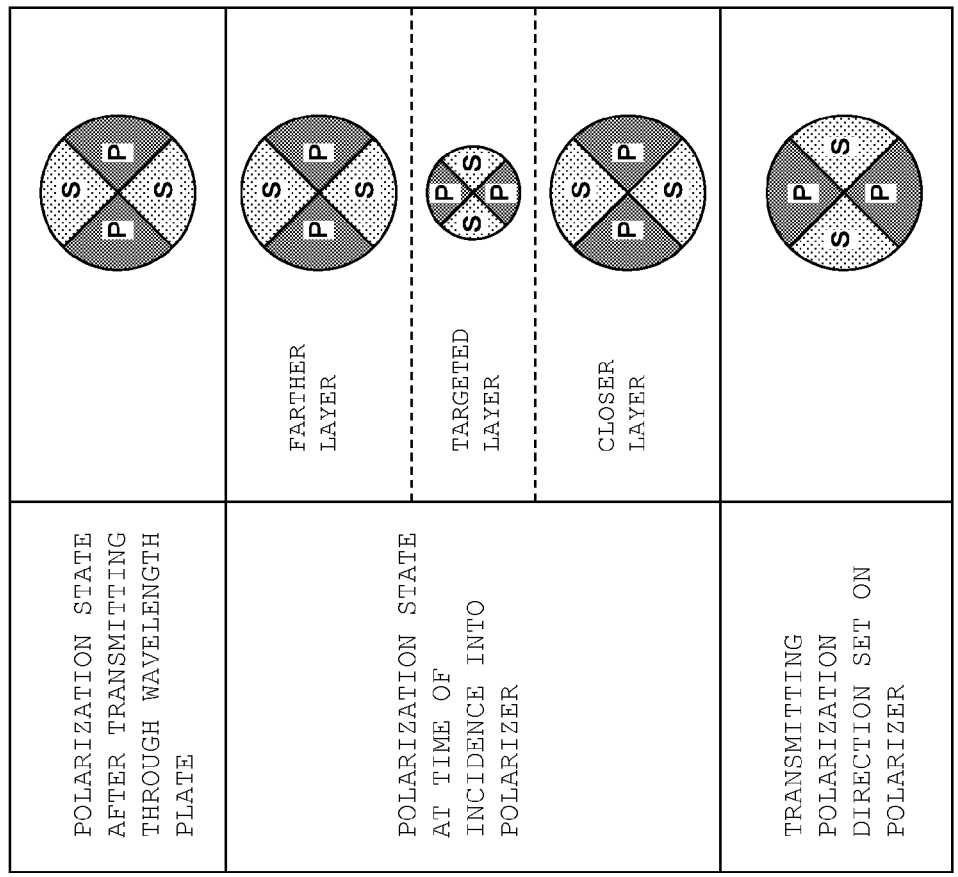

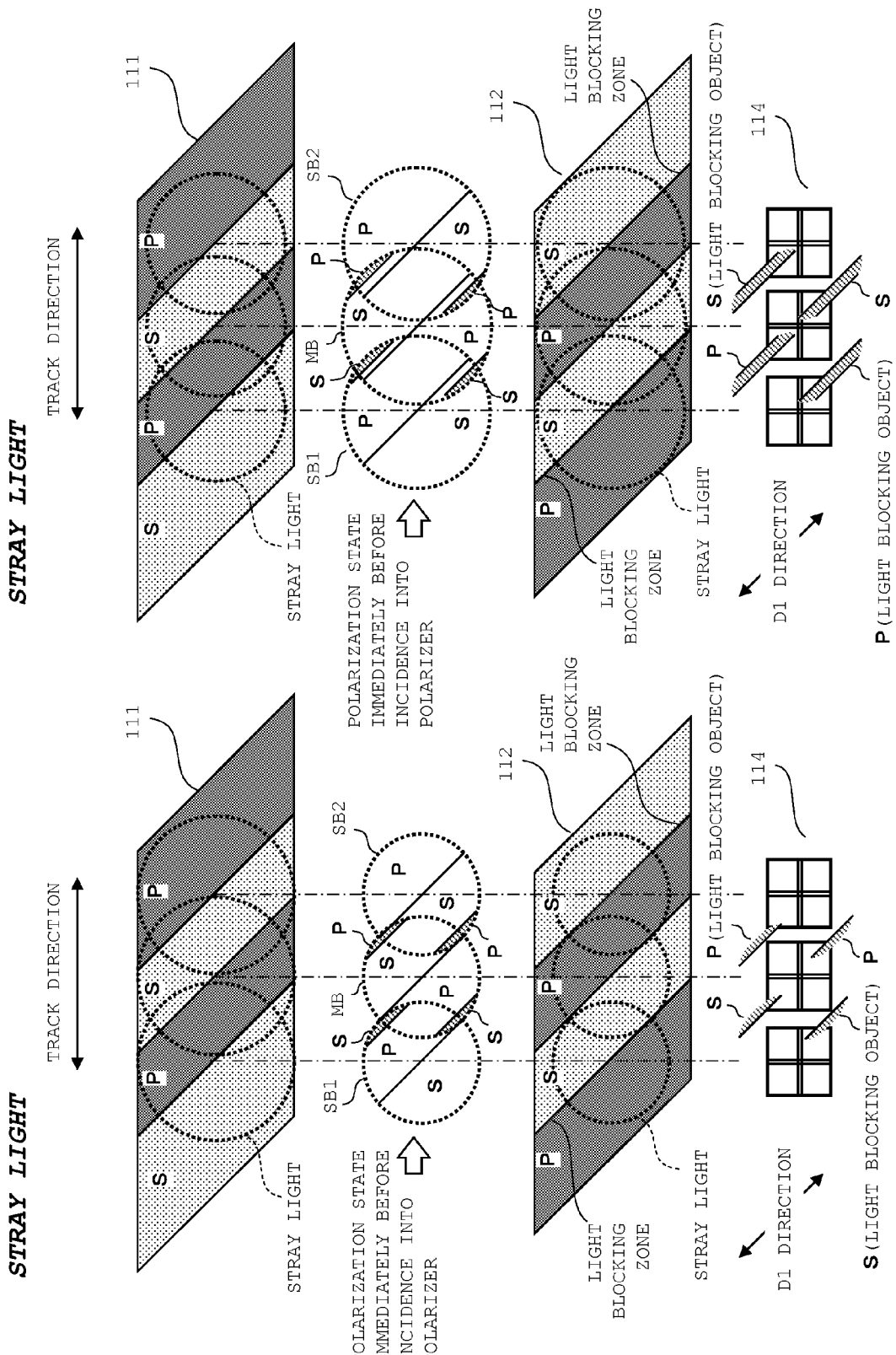

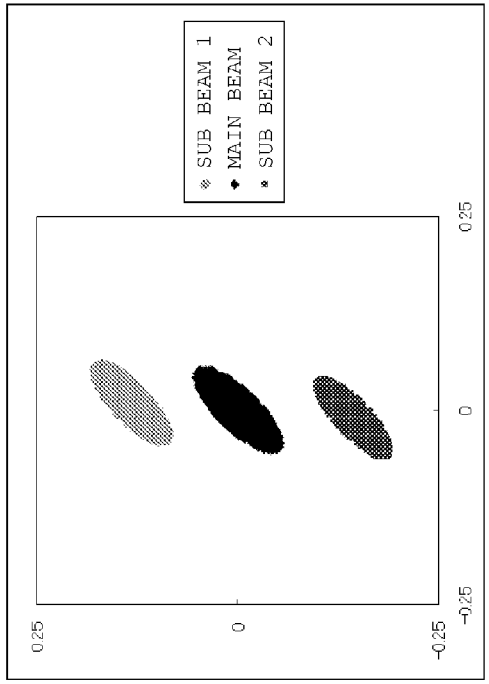
FIG.15B LIGHT FLUX STATE OF THREE BEAMS AT POSITION AWAY FROM PHOTODETECTOR BY 1 mm
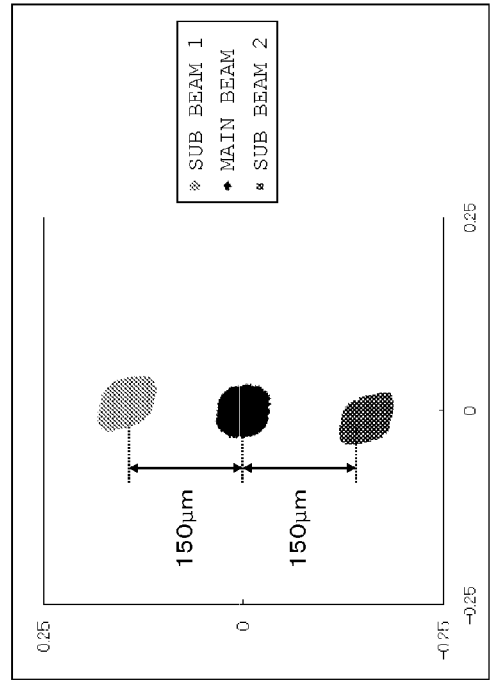
FIG.15D LIGHT FLUX STATE OF THREE BEAMS ON PHOTODETECTOR
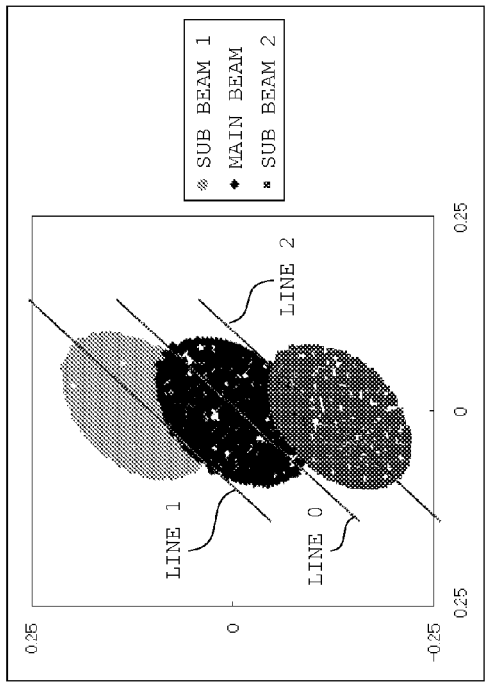
FIG.15A LIGHT FLUX STATE OF THREE BEAMS AT POSITION AWAY FROM PHOTODETECTOR BY 2 mm
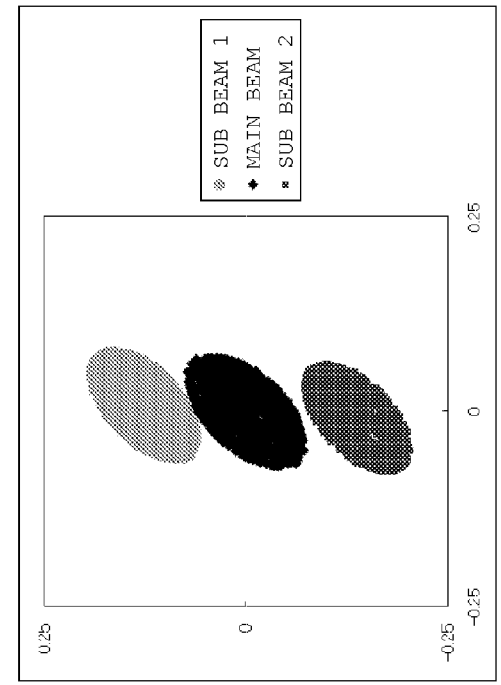
FIG.15C LIGHT FLUX STATE OF THREE BEAMS AT POSITION AWAY FROM PHOTODETECTOR BY 1.5 mm

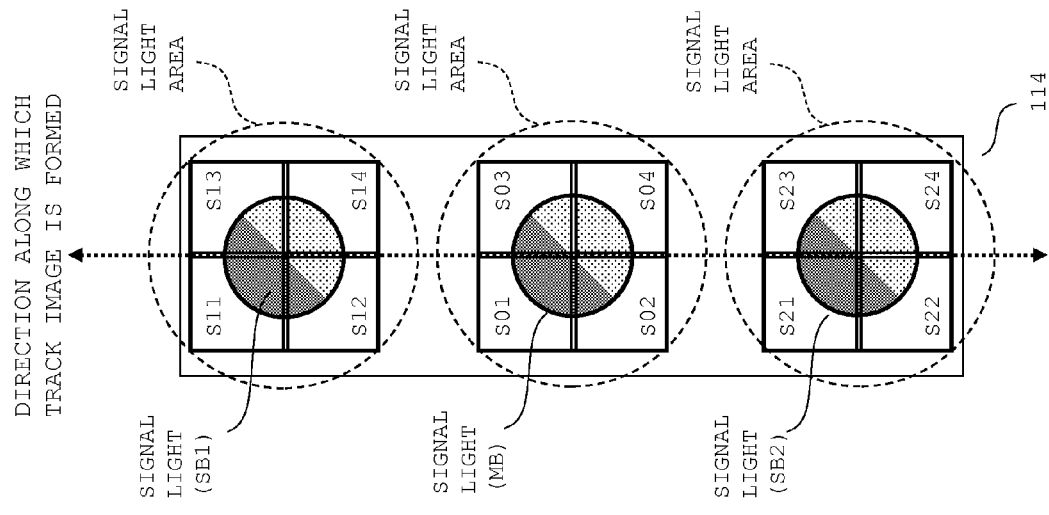

FIG. 18A

| | | | | |
|---|---|---|---|---|
| POLARIZATION STATE AFTER TRANSMITTING THROUGH WAVELENGTH PLATE | | | | |
| | FARTHER LAYER | TARGETED LAYER | CLOSER LAYER | |
| POLARIZATION STATE AT TIME OF INCIDENCE INTO POLARIZER | | | | |
| TRANSMITTING POLARIZATION DIRECTION SET ON POLARIZER | | | | 112a / 境界 |

FIG. 18B

| | | | | | |
|---|---|---|---|---|---|
| POLARIZATION STATE SET ON WAVELENGTH PLATE | 111a / BOUNDARY | | | | |
| POLARIZATION STATE AFTER TRANSMITTING THROUGH WAVELENGTH PLATE | | | | | |
| | | FARTHER LAYER | TARGETED LAYER | CLOSER LAYER | |
| POLARIZATION STATE AT TIME OF INCIDENCE INTO POLARIZER | | | | | |
| TRANSMITTING POLARIZATION DIRECTION SET ON POLARIZER | | | | | 112a / BOUNDARY |

OPTICAL PICKUP DEVICE

This application claims priority under 35 U.S.C. Section 119 of Japanese Patent Application No. 2009-036119 filed Feb. 19, 2009, entitled "OPTICAL PICKUP DEVICE". The discloser of the above application is incorporated herein by reference.

BACKGROUND OF THE INVENTION

1. Field of the Invention

The present invention relates to an optical pickup device, and more particularly to an optical pickup device for recording/reproducing with respect to a recording medium having laminated recording layers.

2. Disclosure of Related Art

In recent years, the capacity of an optical disc has been increased. An increase in the capacity of an optical disc is realized by forming a plurality of recording layers in the disc. For instance, there has been commercialized a multilayer disc having two recording layers on one surface thereof, such as a DVD (Digital Versatile Disc) or a Blu-ray disc. An optical disc having three or more recording layers is advantageous in further increasing the capacity thereof.

However, forming a plurality of recording layers in a disc has a problem that reflection light from a recording layer other than a targeted recording layer to be reproduced may be entered into a photodetector, with the result that a reproduction signal may be deteriorated. This problem is known as a so-called interlayer crosstalk resulting from stray light. Accordingly, it is necessary to provide an arrangement for smoothly suppressing/removing stray light, in the case where a plurality of recording layers are formed in a disc.

As a method for removing stray light, for instance, there is proposed a method, wherein a pinhole is formed in front of a photodetector. As other methods for removing stray light, there are proposed a method, wherein a forward light blocking plate and a rearward light blocking plate are disposed in front of a photodetector, and a method using a polarized optical element.

However, in the method, wherein a pinhole is formed in front of a photodetector, stray light as well as reflection light from a targeted recording layer to be reproduced may reach to the photodetector through the pinhole. In this method, there is a problem that a small distance between recording layers may increase the amount of stray light passing through the pinhole, which obstructs proper removal of interlayer crosstalk. The method, wherein a forward light blocking plate and a rearward light blocking plate are disposed, has a problem that the use efficiency of reflection light may be lowered to about 50%, because a half of the reflection light from a targeted recording layer to be reproduced is blocked. In the method using a polarized optical element, many optical components for removing stray light are required, which causes an increase in the cost.

SUMMARY OF THE INVENTION

An aspect of the invention is directed to an optical pickup device for recording and/or reproducing information with respect to a disc having recording layers in a laminated direction. The optical pickup device according to the aspect includes: a laser light source; an objective lens which converges laser light emitted from the laser light source onto the disc; an astigmatism element which converges the laser light reflected on the disc in a first direction to form a first focal line at a first position, and converges the laser light in a second direction to form a second focal line at a second position closer to the disc than the first position; a polarization setting element which makes polarization directions of light flux portions different from each other, the light flux portions being obtained by dividing a light flux of the laser light transmitted through the astigmatism element into two by a straight line parallel to the first direction; a polarizer into which the laser light transmitted through the polarization setting element is entered, and which transmits light having polarization directions obtained by inverting the polarization directions set by the polarization setting element with respect to the straight line; and a photodetector which receives the laser light transmitted through the polarizer. The polarization setting element is disposed between the second focal line of the laser light reflected on a targeted recording layer of the disc, and the first focal line of the laser light reflected on a recording layer farther than the target recording layer. The polarizer is disposed between the first focal line and the second focal line of the laser light reflected on the targeted recording layer.

BRIEF DESCRIPTION OF THE DRAWINGS

These and other objects, and novel features of the present invention will become more apparent upon reading the following detailed description of the embodiment along with the accompanying drawings.

FIGS. 2A through 2D are diagrams showing light ray convergent states in Example 1.

FIGS. 3A and 3B are diagrams showing polarization states and a sensor pattern in Example 1.

FIG. 4A is a diagram showing an optical system to be used in simulation in Example 1.

FIG. 4B is a diagram showing states of signal light and stray light at the time of simulation.

FIGS. 5A through 5D are diagrams showing verification result 1 of simulation in Example 1.

FIGS. 8A through 8D are diagrams showing an arrangement of a comparative example in Example 1.

FIGS. 9A and 9B are diagrams showing polarization states and a sensor pattern in the comparative example.

FIGS. 14A and 14B are diagrams schematically showing polarization states of stray light by the three-beam method in Example 2.

FIGS. 15A through 15D are diagrams showing verification result 5 of simulation in Example 2.

FIGS. 16A and 16B are diagrams showing polarization states and a sensor pattern in Modification Example 1.

FIGS. 18A and 18B are diagrams showing polarization states and sensor patterns in Modification Example 3.

Figure 1:
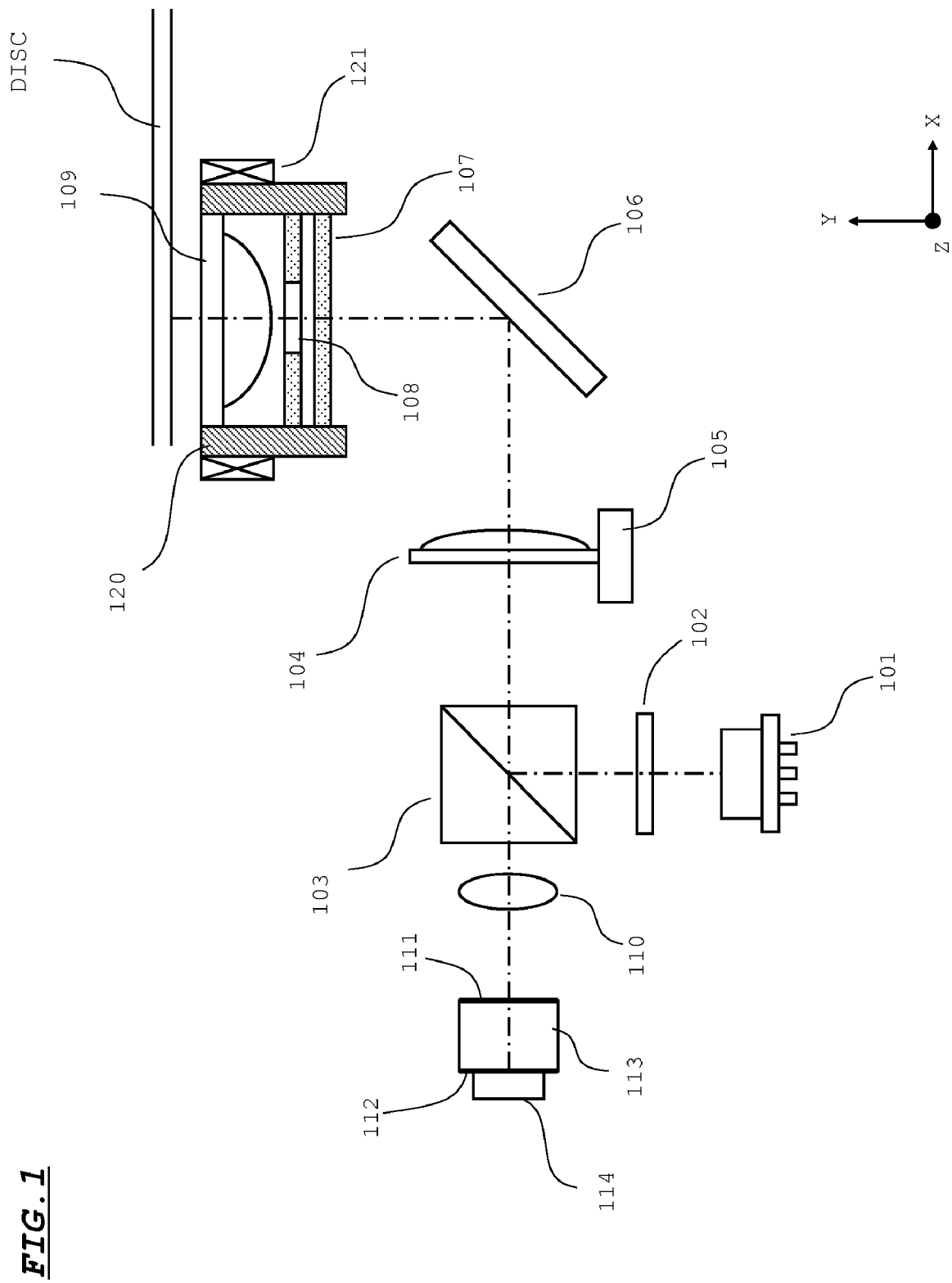
FIG. 1 is a diagram showing an optical system in an optical pickup device in Example 1 of the invention.

The drawings are provided mainly for describing the present invention, and do not limit the scope of the present invention.

DESCRIPTION OF PREFERRED EMBODIMENTS

In the following, an embodiment of the invention is described referring to the drawings. The embodiment is an application of the invention directed to an optical pickup device compatible with an optical disc having recording layers in a thickness direction thereof.

EXAMPLE 1

FIG. 1 is a diagram showing an optical system in an optical pickup device embodying the invention.

A semiconductor laser 101 emits laser light of a predetermined wavelength. A half wavelength plate 102 converts the laser light emitted from the semiconductor laser 101 into S-polarized light with respect to a polarized beam splitter 103. The polarized beam splitter (PBS) 103 substantially totally reflects the laser light (S-polarized light) to be entered from the half wavelength plate 102, and substantially totally transmits laser light (P-polarized light) to be entered from a collimator lens 104.

The collimator lens 104 converts the laser light to be entered from the PBS 103 into parallel light. A lens actuator 105 displaces the collimator lens 104 in an optical axis direction to correct an aberration in the laser light. A rise-up mirror 106 reflects the laser light entered from the collimator lens 104 in a direction toward an objective lens 109.

A quarter wavelength plate 107 converts laser light directed toward a disc into circularly polarized light, and change a direction of reflection light from the disc to a polarization direction perpendicular to a polarization direction of the laser light directed toward the disc. Accordingly, the laser light reflected on the disc is substantially totally transmitted through the PBS 103, and guided to an anamorphic lens 110.

An aperture 108 adjusts the beam shape of laser light into a circular shape to properly set the effective diameter of laser light with respect to the objective lens 109. The objective lens 109 is so designed as to properly converge laser light onto a targeted recording layer in the disc. A holder 120 integrally holds the quarter wavelength plate 107, the aperture 108, and the objective lens 109. An objective lens aperture 121 is constituted of a conventional and well-known electromagnetic driving circuit to drive the holder 120 in a focus direction and a tracking direction.

Laser light irradiated onto the disc is reflected on a recording layer in the disc. The reflected laser light is propagated along an optical path opposite to the incoming optical path, transmitted through the PBS 103, and entered into the anamorphic lens 110. The anamorphic lens 110 converts the reflection light from the disc in D1 direction and D2 direction perpendicular to D1 direction, thereby imparting astigmatism to the reflection light. In the present example, the anamorphic lens 110 is disposed at such a position that D1 direction and D2 direction are each inclined at 45 degrees with respect to a direction along which a track image from a disc is formed. D1 direction and D2 direction are described later referring to FIGS. 2A through 2D.

The laser light to be emitted from the anamorphic lens 110 is entered into a wavelength plate 111. The wavelength plate 111 has two polarization setting areas, wherein one of the two polarization setting areas is adapted to transmit laser light in one of two light flux areas obtained by dividing an entered laser light flux area into two, as P-polarized light, and the other of the two polarization setting areas is adapted to convert laser light in the other of the two light flux areas into S-polarized light. A polarizer 112 has two transmitting polarization areas for transmitting P-polarized light and S-polarized light, respectively. Each of the transmitting polarization areas is so designed as to transmit only reflection light from a targeted layer, which will be described later. A transparent member 113 is a light transmissive member formed of e.g. glass, and is formed with the wavelength plate 111 and the polarized 112 at an incident surface and an exit surface thereof, respectively. Thus, integrally forming the wavelength plate 111 and the polarizer 112 on the transparent member 113 enables to enhance installation operability, and reduce the number of parts, because there is no need of adjusting the positions of the wavelength plate 111 and the polarizer 112 at the time of assembling an optical system.

A photodetector 114 is disposed in proximity to the polarizer 112, and receives laser light to be emitted from the polarizer 112 to output a detection signal. A four-division sensor is arranged on a light receiving surface of the photodetector 114. A focus error signal is generated by an astigmatism method, based on a signal to be outputted from the four-division sensor, and a tracking error signal is generated by a one-beam push-pull method.

FIGS. 2A through 2D are diagrams showing light ray convergence states. FIG. 2A is a diagram showing a light ray convergence state in the vicinity of the photodetector 114. FIGS. 2B through 2D are diagrams each showing a relation between reflection light (signal light) from a targeted layer at the time of incidence into the anamorphic lens 110, the wavelength plate 111, and the polarizer 112; and these elements.

Referring to FIG. 2B, the anamorphic lens 110 converges the incident reflection light into D1 direction (a first convergence direction) and D2 direction (a second convergence direction) perpendicular to D1 direction. The curvature radius of the anamorphic lens 110 in D2 direction is set smaller than that in D1 direction, and accordingly, the anamorphic lens 110 has an effect of greatly converging laser light in D2 direction, as compared with D1 direction. Since the reflection light (signal light) from a targeted layer is formed into a circular shape through the aperture 108, the reflection light has a circular shape, as shown in FIG. 2B.

Referring to FIG. 2A, reflection light (signal light) from a targeted layer, which has been converged by the anamorphic lens 110, forms focal lines at different positions from each other by convergence in D1 direction and D2 direction. The focal line position (S1) by convergence in D1 direction is farther from the anamorphic lens 110 than the focal line position (S2) by convergence in D2 direction. The convergence position (a position where a beam forms a least circle of confusion) of reflection light (signal light) from the targeted layer is set to an intermediate position between the focal line positions (S1) and (S2) by convergence in D1 direction and D2 direction.

Similarly to the above, concerning reflection light from a layer farther from a laser light incident surface than the targeted layer, a focal line position (M11) by convergence in D1 direction is farther from the anamorphic lens 110 than a focal line position (M12) by convergence in D2 direction. Further, the anamorphic lens 110 is so designed as to set the focal line position (M11) of reflection light from the farther layer by convergence in D1 direction closer to the anamorphic lens 110 than the focal line position (S2) of reflection light from the targeted layer by convergence in D2 direction.

Similarly to the above, concerning reflection light from a layer closer to the laser light incident surface than the targeted layer, a focal line position (M21) by convergence in D1 direction is farther from the anamorphic lens 110 than a focal line position (M22) by convergence in D2 direction. Further, the anamorphic lens 110 is so designed as to set the focal line position (M22) of reflection light from the closer layer by convergence in D2 direction farther from the anamorphic lens 110 than the focal line position(S1) of reflection light from the targeted layer by convergence in D1 direction.

The wavelength plate 111 is disposed between the convergence position (M11) of reflection light from the farther layer in D1 direction, and the convergence position (S2) of reflection light from the targeted layer in D2 direction. Further, an incident surface of the photodetector 114 is disposed at a convergence position (SO) of reflection light from the targeted layer.

Referring to FIG. 2C, a polarization setting area of the wavelength plate 111 is divided into two by a straight line parallel to D1 direction. As shown in FIG. 2C, a light flux of reflection light (signal light) from the targeted layer has a smaller size in D2 direction than in D1 direction.

Referring to FIG. 2D, a transmitting polarization area of the polarizer 112 is divided into two by a straight line parallel to D1 direction. As shown in FIG. 2D, reflection light (signal light) from the targeted layer has a circular shape, because the polarizer 112 is disposed in the vicinity of the convergence position (SO) of reflection light from the targeted layer.

FIG. 3A is a diagram schematically showing a polarization state at each of the positions. Reflection light from the targeted layer, the farther layer, and the closer layer after transmitting through the wavelength plate 111 has a polarization state (hereinafter, called as "SP-polarization state"), wherein an upper left portion of the light flux is S-polarized light, and a lower right portion of the light flux is P-polarized light.

Reflection light from the farther layer after transmitting through the wavelength plate 111 does not form focal lines either in D1 direction or D2 direction. Accordingly, the reflection light from the farther layer at the time of incident into the polarizer 112 has an SP-polarization state, which is identical to the polarization state of light after transmitting through the wavelength plate 111.

Reflection light from the targeted layer after transmitting through the wavelength plate 111 forms a focal line only in D2 direction, and is entered into the polarizer 112 before forming a focal line in D1 direction. Accordingly, the polarization state of reflection light from the targeted layer is inverted only with respect to D1 direction as a symmetry axis. Specifically, reflection light from the targeted layer at the time of incidence into the polarizer 112 has a polarization state (hereinafter, called as "PS-polarization state"), wherein an upper left portion of the light flux is P-polarized light, and a lower right portion of the light flux is S-polarized light.

Reflection light from the closer layer forms focal lines at positions farther from the polarizer 112 both in D1 direction and D2 direction. Accordingly, the reflection light from the closer layer at the time of incidence into the polarizer 112 has an SP-polarization state, which is identical to the polarization state of light after transmitting through the wavelength plate 111.

The transmitting polarization direction in each of the transmitting polarization areas set on the polarizer 112 is aligned with a polarization direction of PS-polarized light. Accordingly, out of the reflection light to be entered into the polarizer 112, only the reflection light from the targeted layer, which is PS-polarized light whose polarization direction is aligned with the transmitting polarization direction of the polarizer 112, is transmitted, and the reflection light from the farther layer and the closer layer is blocked.

FIG. 3B is a diagram showing a sensor pattern on the photodetector 114. As described above, only the reflection light (signal light) from the targeted layer is transmitted through the polarizer 112, and entered into the photodetector 114. This enables to generate a focus error signal, a tracking error signal, and a reproduction RF signal.

As described above, according to the present example, only the reflection light from the targeted layer is entered into the photodetector 114, and reflection light from the layers other than the targeted layer is not entered into the photodetector 114. This arrangement enables to obtain various signals having high precision.

Next, description as to how incidence of reflection light from the layers other than the targeted layer into the photodetector 114 is suppressed is made, using results of simulation conducted by the inventor of the present application.

FIG. 4A is a diagram showing an optical system used in simulation of the present example. In FIG. 4A, optical elements substantially equivalent to those shown in FIG. 1 are indicated with the same reference numerals. In FIG. 4A, the transparent member 113 is omitted, and a space between the wavelength plate 111 and the polarizer 112 is defined as a void.

The design condition of the optical system is as follows.
(1) the wavelength of the semiconductor laser 101: 405 nm
(2) the optical path length between the wavelength plate 111 and the polarizer 112: 1.5 mm
(3) the spot diameter on the light receiving surface of the photodetector 114: 60 μm
(4) the focal length of the objective lens 109: 1.4 mm
(5) the numerical aperture (NA) of the objective lens 109: 0.85
(6) the lateral magnification by the objective lens 109 and the collimator lens 104: 10
(7) the lateral magnification by the objective lens 109 and the detection lens: 20
(8) the focal line interval of reflection light from the targeted layer: 1.4 mm FIG. 4B is a diagram showing states of signal light (reflection light from a targeted layer), and stray light (reflection light from a recording layer other than the targeted layer) at the time of simulation. The simulation is made based on the premise that there is only one recording layer other than a targeted recording layer. As shown in FIG. 4B, laser light is focused on the targeted layer, and reflected as signal light. A part of the laser light is also entered into the other recording layer, and reflected as stray light.

The other recording layer is assumed to be disposed at a position away from the targeted layer by Δd in a rearward direction (a direction farther from the objective lens 109) as plus-direction. Reflectances of the respective recording layers are set in such a manner that light of the same light amount is reflected from each of the recording layers at a focal position, in the case where laser light is focused on each of the recording layers.

Verification Result 1

FIGS. 5A through 5D are diagrams showing intensity distributions of signal light and stray light to be entered into the photodetector 114 in the simulation condition described referring to FIGS. 4A and 4B. FIGS. 5A and 5C are diagrams (hereinafter, called as an "existing example") showing simulation results, wherein the wavelength plate 111 and the polarizer 112 are omitted from the optical system shown in FIG.

4A, and FIGS. 5B and 5D are diagrams showing simulation results in the present example using the optical system shown in FIG. 4A.

Referring to FIGS. 5A through 5D, dark color portions (black portions) indicate that the light intensity is large, and light color portions (white portions) indicate that the light intensity is small. The axis of ordinate and the axis of abscissa in FIGS. 5A through 5D each shows a position (unit: μm) of light on the light receiving surface of the photodetector 114.

Referring to FIGS. 5A and 5C, in the existing example, although signal light is properly entered into the photodetector 114, stray light from the other recording layer at the position: $\Delta d=+10$ μm is entered into the entirety of the photodetector 114. On the other hand, referring to FIGS. 5B and 5D, in the simulation of the present example, although signal light to be entered into the photodetector 114 is slightly reduced in the vicinity of a central portion of the light receiving surface of the photodetector 114, stray light from the other recording layer at the position: $\Delta d=+10$ μm is hardly entered into the photodetector 114.

Verification Result 2

Figure 6:
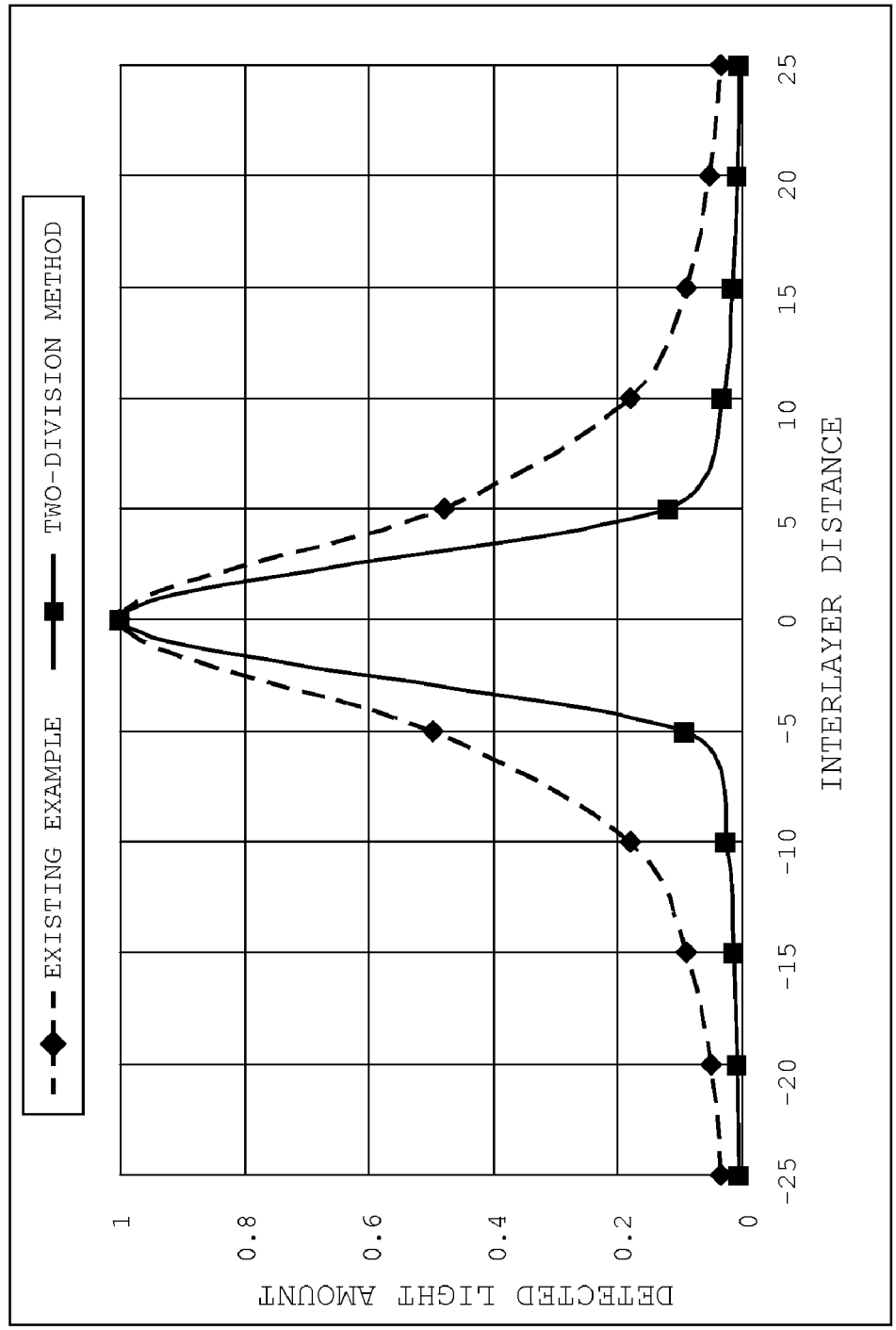
FIG. 6 is a graph showing verification result 2 of simulation in Example 1.

FIG. 6 is a graph showing that the light amount of stray light from the other recording layer away from the targeted layer by $\Delta d$, which is detected by the photodetector 114, is varied depending on $\Delta d$ in the simulation results of the existing example and the present example. The maximum value in the simulation result of the present example is normalized, assuming that the maximum value in the simulation result of the existing example is 1.

As shown in FIG. 6, in the case where the interlayer distance $\Delta d$ is 0 μm, the other recording layer coincides with the targeted layer. Accordingly, stray light is maximized (stray light=signal light). As the absolute value of the interlayer distance $\Delta d$ is gradually increased, as compared with the existing example, in the simulation of the present example, the detected light amount of stray light is remarkably reduced. In other words, in the simulation result of the present example, stray light from the other recording layer at a position farther than the targeted layer is remarkably reduced, as compared with the simulation result in the existing example.

Verification Result 3

Figure 7A:
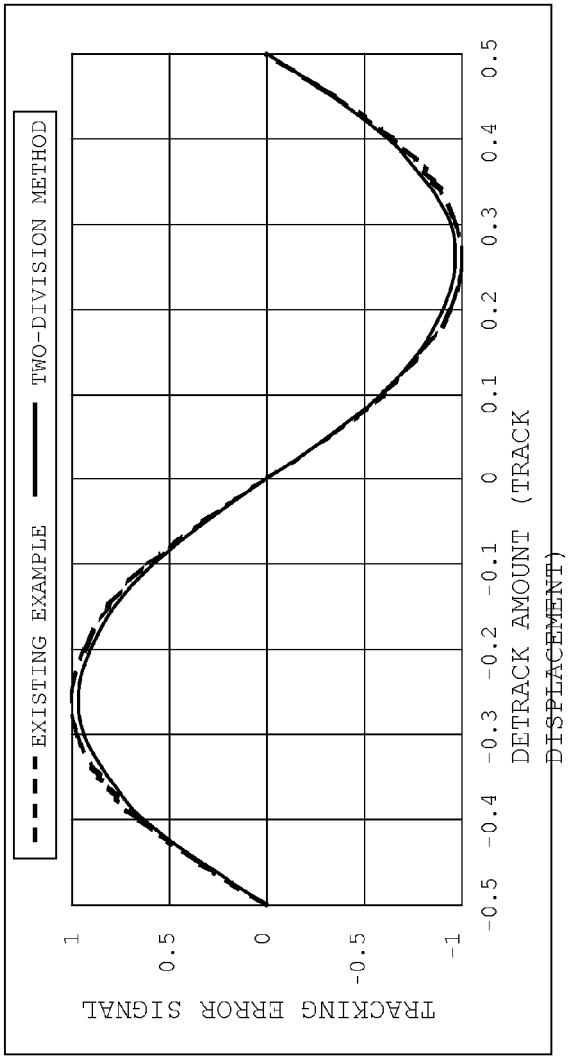
FIGS. 7A and 7B are graphs showing verification result 3 of simulation in Example 1.
Figure 7B:
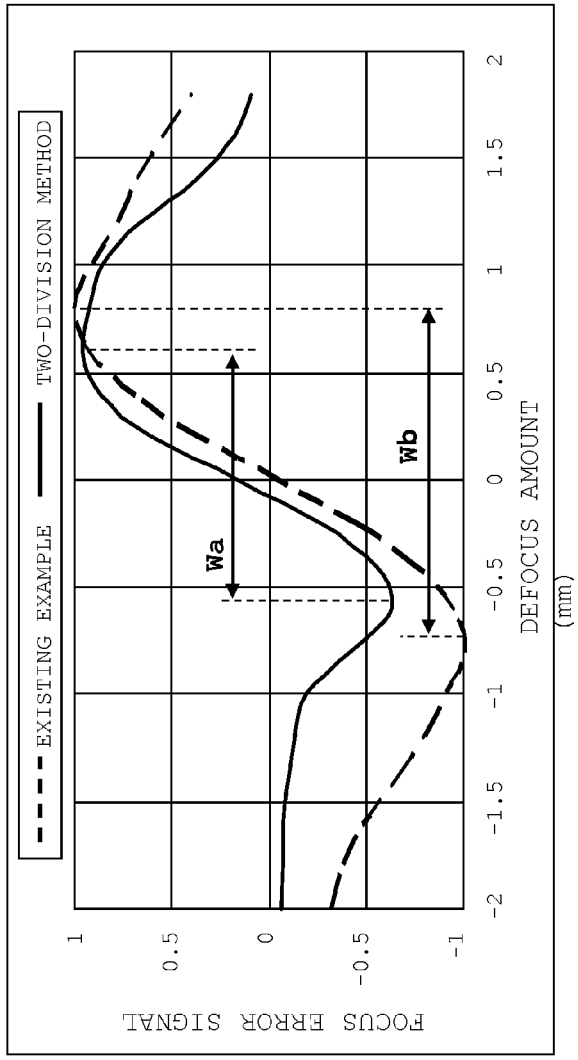

FIG. 7A is a graph showing that a tracking error signal is varied depending on a detrack amount (a track displacement) in the simulation results of the existing example and the present example, and FIG. 7B is a graph showing that a focus error signal is varied depending on a defocus amount (a focus displacement). Referring to FIGS. 7A and 7B, a varied amount in the simulation result of the present example is normalized, assuming that the maximum value in the simulation result of the existing example is 1.

Referring to FIG. 7A, the tracking error signal depending on the detrack amount becomes 0 when the detrack amount is 0 in both of the simulation results of the existing example and the present example. Amplitudes and periods are also substantially the same between the simulation results of the existing example and the present example. In other words, similarly to the existing example, the present example is also advantageous in obtaining a tracking error signal having high precision.

Referring to FIG. 7B, a peak-to-peak width (Wa) of an S-shaped curve in the simulation result of the present example is smaller than a peak-to-peak width (Wb) of an S-shaped curve in the existing example. Since the range capable of performing a focus pull-in operation with respect to a targeted layer is reduced, it may be slightly difficult to perform a focus pull-in operation. However, since the peak-to-peak width of the S-shaped curve in the simulation result of the present example is smaller than that in the existing example, separation of an S-shaped curve with respect to each of the layers is made easy, thereby making it easy to discriminate the layers one from the other at the time of performing a focus pull-in operation.

As compared with the existing example, in the simulation result of the present example, a displacement at a zero-cross position of the S-shaped curve is large with respect to a defocus amount of 0. In the case where the displacement is so large as to cause a problem, adjustment on a focus pull-in operation may be performed in advance so that the focus pull-in operation is performed at a position where a defocus amount is 0.

Thus, verification results 1 through 3 of simulation of the present example show that stray light to be entered into the photodetector 114 can be advantageously suppressed, as compared with the existing example. Further, similarly to the existing example, the present example enables to obtain a tracking error signal and a focus error signal to such an extent that various adjustments can be properly performed.

COMPARATIVE EXAMPLE

Next, comparison is made between Example 1 and a comparative example (see JP 2008-130152A).

FIG. 8A is a diagram showing an arrangement of the comparative example.

Referring to FIG. 8A, in the comparative example, a wavelength plate 111 is disposed in a parallel light flux anterior to an anamorphic lens 110.

Referring to FIG. 8C, the anamorphic lens 110 is disposed in the same manner as described referring to FIGS. 2A through 2D.

Referring to FIG. 8B, a polarization setting area of the wavelength plate 111 is divided into four by two straight lines parallel to D1 direction and D2 direction. Reflection light (signal light) from a targeted layer is formed into a circular shape through an aperture 108. Accordingly, as shown in FIG. 8B, the reflection light from the targeted layer has a circular shape.

Referring to FIG. 8D, a transmitting polarization area of a polarizer 112 is divided into four by two straight lines parallel to D1 direction and D2 direction. Reflection light (signal light) from the targeted layer is formed into a circular shape, as shown in FIG. 8D, because the polarizer 112 is disposed at a position in the vicinity of a convergence position (SO) of reflection light (signal light) from the targeted layer.

FIG. 9A is a diagram showing a polarization state at each of the positions. As shown in FIG. 9A, in the comparative example, polarization states at the time of incidence into the polarizer 112 are different between reflection light (signal light) from the targeted layer, and reflection light (stray light) from a farther layer and a closer layer. Accordingly, setting transmitting polarization directions in the transmitting polarization areas of the polarizer 112 as shown in FIG. 9A enables to guide only the signal light to the photodetector 114.

FIG. 9B is a diagram showing a sensor pattern on the photodetector 114. Similarly to Example 1, various signals can be generated based on an output signal from the photodetector 114.

Next, simulation of the comparative example was made in the same simulation condition as in Example 1, wherein the wavelength plate 111 is disposed in a parallel light flux anterior to the anamorphic lens 110, and comparison was made between the present example and the comparative example. The wavelength plate 111 may be disposed at any position in the parallel light flux.

Verification Result 4

Figure 10:
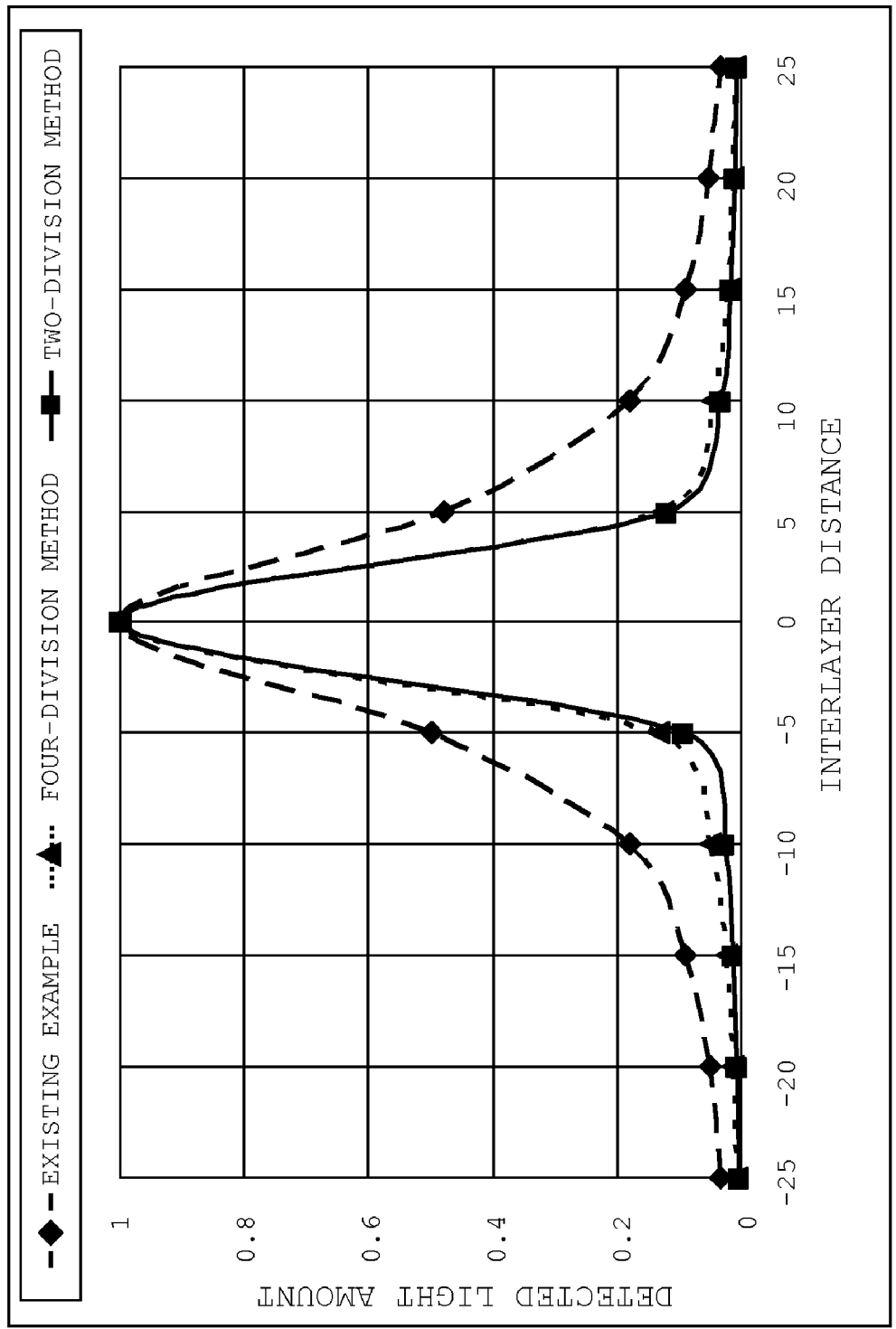
FIG. 10 is a graph showing verification result 4 of simulation in the comparative example.

FIG. 10 is a graph showing that the light amount of stray light from the other recording layer away from the targeted layer by Δd, which is detected by the photodetector 114, is varied depending on Δd. FIG. 10 shows a simulation result of the comparative example along with the simulation result (see FIG. 6) of Example 1.

As shown in FIG. 10, in the comparative example (using a four-division method), the detected light amount of stray light to be entered into the photodetector 114 is larger than that in Example 1 (using a two-division method). Thus, the simulation result shows that Example 1 has an advantageous effect of removing stray light, as compared with the comparative example.

In Example 1, the wavelength plate 111 and the polarizer 112 are integrally formed on the transparent member 113. In the arrangement of the comparative example, since the wavelength plate 111 is disposed in the parallel light flux anterior to the anamorphic lens 110, it is impossible to integrally form the wavelength plate 111 and the polarizer 112. Accordingly, as compared with the comparative example, Example 1 is advantageous in simplifying the arrangement, reducing the number of parts, and simplifying the adjusting process.

EXAMPLE 2

In Example 1, one-beam laser light emitted from the semiconductor laser 101 is received by the photodetector 114. In the present example, laser light emitted from a semiconductor laser 101 is divided into three beams, and the three beams are received by a photodetector.

Figure 11:
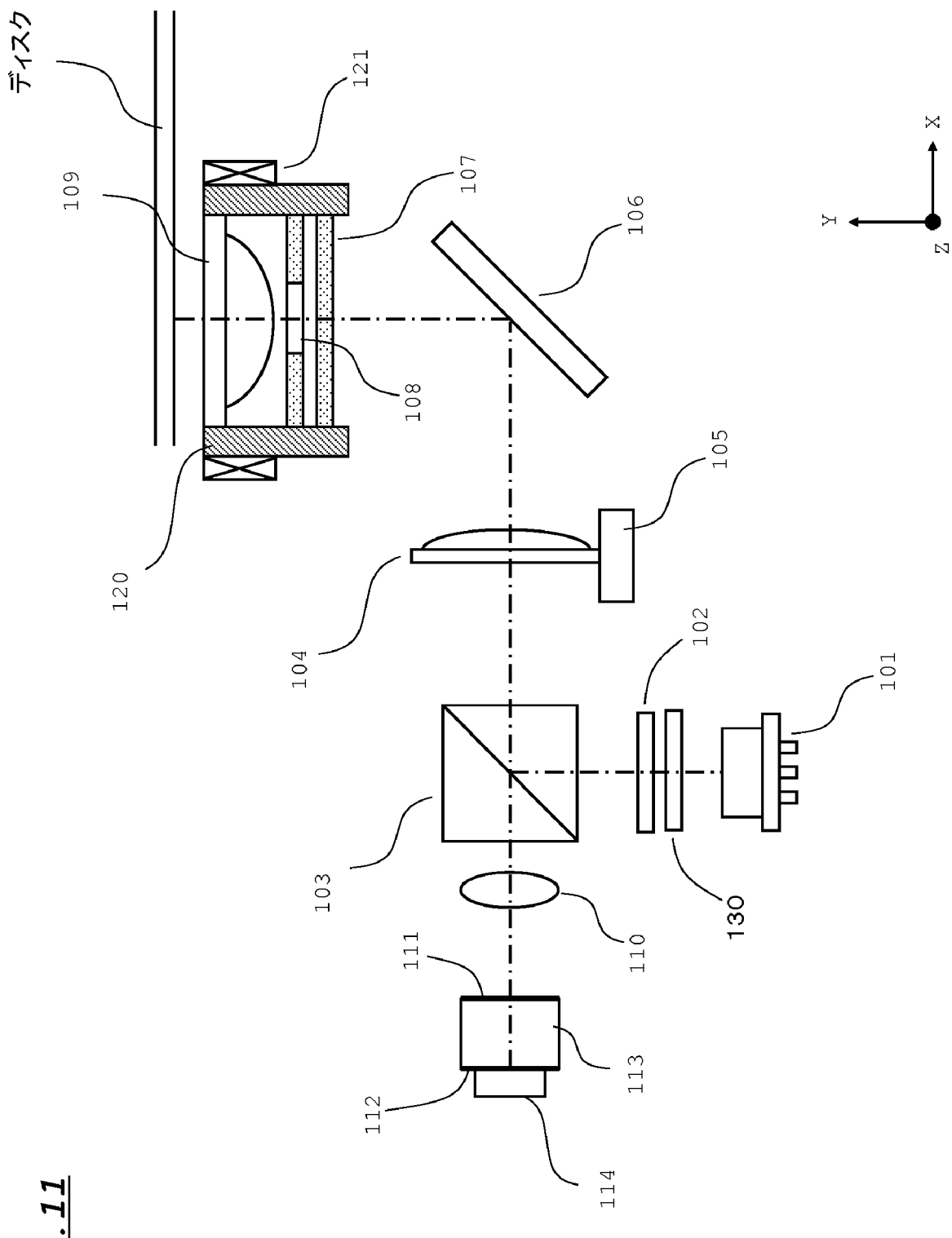
FIG. 11 is a diagram showing an optical system in an optical pickup device in Example 2 of the invention.

FIG. 11 is a diagram showing an optical system in an optical pickup device in the present example.

As shown in FIG. 11, Example 2 is different from Example 1 in that a diffraction element 130 is disposed between the semiconductor laser 101 and a half wavelength plate 102. The diffraction element 130 divides laser light emitted from the semiconductor laser 101 into three beams i.e. a main beam, a sub beam 1, and a sub beam 2.

Similarly to Example 1, laser light divided into three beams is reflected on a predetermined recording layer in a disc, and then, received on a photodetector 114. The photodetector 114 is constructed by arranging three conventional photodetecting elements each adapted to detect a single beam in a direction along which a track image is formed.

Next, signal light (reflection light from a targeted layer) and stray light (reflection light from a layer other than the targeted layer) to be entered into a wavelength plate 111 and a polarizer 112 are described depending on incident states on the wavelength plate 111 and the polarizer 112.

Figure 12A:
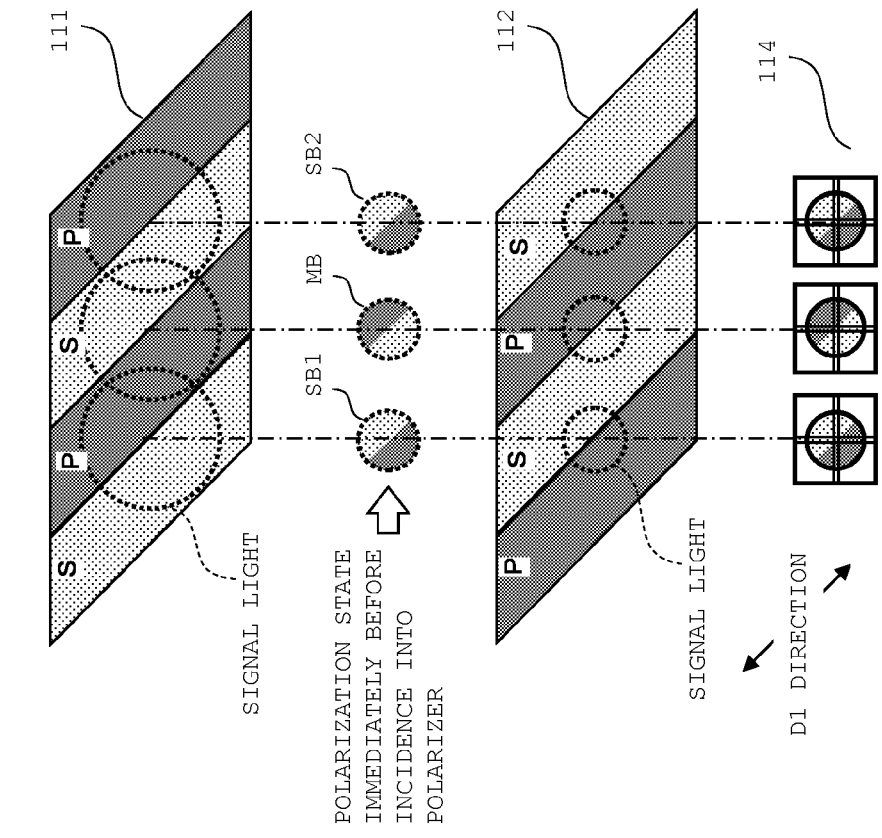
FIGS. 12A and 12B are diagrams schematically showing polarization states of signal light by a three-beam method in Example 2.
Figure 12B:
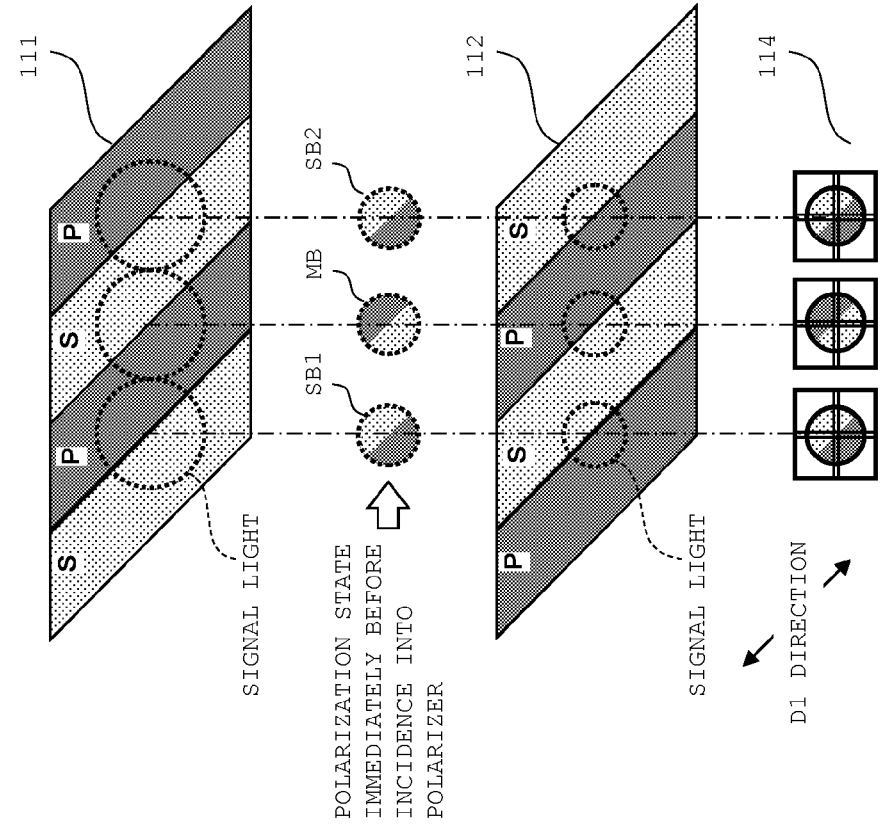

FIGS. 12A and 12B are diagrams schematically showing polarization states of three beams of signal light to be entered into the wavelength plate 111 and the polarizer 112. FIG. 12A is a diagram showing a case that the beams to be entered into the wavelength plate 111 are not superimposed one over the other, and FIG. 12B is a diagram showing a case that a main beam and two sub beams to be entered into the wavelength plate 111 are superimposed one over the other. In FIGS. 12A and 12B, MB indicates a light flux of the main beam, SB1 indicates a light flux of the sub beam 1, and SB2 indicates a light flux of the sub beam 2.

Referring to FIGS. 12A and 12B, a polarization setting area of the wavelength plate 111 is divided into four, wherein two areas whose polarization states of transmitting laser light are an S-polarization state and a P-polarization state are adjacent to each other with respect to a boundary parallel to D1 direction. The wavelength plate 111 is so designed as to divide a polarization state of each of the beams to be entered into the wavelength plate 111 into two polarization states. A transmitting polarization area of the polarizer 112 is divided into four, wherein two areas for transmitting P-polarized light and S-polarized light are adjacent to each other with respect to a boundary parallel to D1 direction. The polarizer 112 is so designed as to allow each of the beams to be entered into the polarizer 112 to be equally entered into the respective adjacent transmitting polarization areas, without superimposing one over the other.

In both of the cases shown in FIGS. 12A and 12B, similarly to Example 1, each of the beams of signal light has its polarization state inverted with respect to D1 direction as a symmetry axis, and is transmitted through the corresponding transmitting polarization area set on the polarizer 112. Accordingly, each of the beams of signal light is entered into the corresponding photodetecting element of the photodetector 114.

FIGS. 13A, 13B, 14A, and 14B are diagrams schematically showing polarization states of three beams of stray light to be entered into the wavelength plate 111 and the polarizer 112.

Figures 13A, 13B:
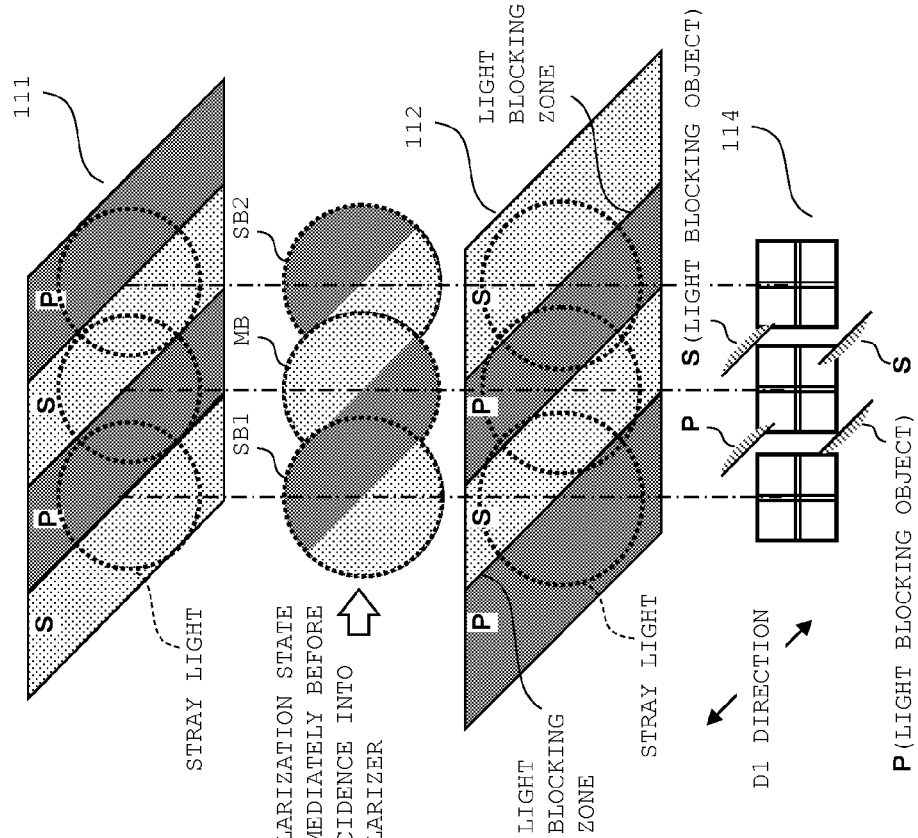
FIGS. 13A and 13B are diagrams schematically showing polarization state of stray light by the three-beam method in Example 2.

FIG. 13A is a diagram showing a case that a polarization state of each of the beams of stray light is divided into two polarization states by the wavelength plate 111, and each of the beams to be entered into the polarizer 112 is entered only into the corresponding two transmitting polarization areas. In this case, each of the beams is blocked by the corresponding transmitting polarization area set on the polarizer 112, and is not entered into the corresponding photodetecting element of the photodetector 114.

FIG. 13B is a diagram showing a case that a polarization state of each of the beams of stray light is divided into two polarization states by the wavelength plate 111, and each of the beams to be entered into the polarizer 112 is entered into the polarizer 112 in such a manner that the main beam is entered into four transmitting polarization areas, and each of the sub beams is entered into corresponding three transmitting polarization areas. In this case, a part of each of the beams is not blocked by the polarizer 112, and as shown in a lowermost portion of FIG. 13B, a part of the main beam and the two sub beams of stray light is entered into the photodetector 114.

As described above, in the case where a part of stray light is entered into the photodetector 114, particularly, in the case where the main beam of stray light is partially superimposed on a sensing portion for receiving a sub beam, a detection signal of the sub beam may be deteriorated. In view of this, two light blocking zones may be formed at the outer two boundaries of the three boundaries between the four transmitting polarization areas set on the polarizer 112 to prevent the main beam of stray light from being entered into the photodetector 114. Accordingly, although a part of the sub beams of stray light may be transmitted through the polarizer 112 and entered into the photodetector 114, a part of the main beam of stray light whose light amount is large is blocked by the light blocking zones, and is not entered into the photodetector 114. Thus, the above arrangement enables to enhance precision of various signals to be generated based on an output signal from the photodetector 114.

FIG. 14A is a diagram showing a case that an incident area of stray light on the wavelength plate 111 is increased, as compared with the cases shown in FIGS. 13A and 13B. In this case, a polarization state of each of the beams of stray light is divided by the wavelength plate 111 in such a manner that a polarization state of the main beam of stray light is divided into four polarization states, and a polarization state of each of the sub beams of stray light is divided into three polarization states. Each of the beams of stray light to be entered into the polarizer 112 is entered only into the corresponding two transmitting polarization areas. In this case, similarly to the above, as shown in FIG. 14A, a part of each of the beams of stray light is not blocked by the polarizer 112, and is entered into the photodetector 114. In view of this, similarly to FIG. 13B, light blocking zones may be formed on the polarizer 112.

FIG. 14B is a diagram showing a case that an incident area of stray light on the wavelength plate 111 is increased, and an incident area of stray light on the polarizer 112 is also increased, as compared with the cases shown in FIGS. 13A and 13B. In this case, a polarization state of each of the beams of stray light is divided by the wavelength plate 111 in such a manner that a polarization state of the main beam is divided into four polarization states, and a polarization state of each of the sub beams is divided into three polarization states. Likewise, each of the beams of stray light to be entered into the polarizer 112 is entered into the polarizer 112 in such a manner that the main beam is entered into four transmitting polarization areas, and each of the sub beams is entered into the corresponding three transmitting polarization areas. In this case, similarly to the above, as shown in FIG. 14B, a part of each of the beams of stray light is not blocked by the polarizer 112, and is entered into the photodetector 114. In view of this, similarly to FIG. 13B, light blocking zones may be formed on the polarizer 112.

As described above, the present example is advantageous in allowing reflection light (signal light) from a targeted layer to be entered into the photodetector 114, while suppressing reflection light (stray light) from a layer other than the targeted layer from being entered into the photodetector 114. This enables to obtain various signals having high precision by the photodetector 114.

Next, simulation was made about states of a main beam and two sub beams after transmitting through an anamorphic lens 110 in the present example by a light ray tracing method in the same simulation condition as in Example 1. In the simulation, as shown in FIG. 11, the diffraction element 130 is disposed between the semiconductor laser 101 and the half wavelength plate 102. Further, an optical system is set on a light receiving surface of the photodetector 114 in such a manner that the interval between three beams is set to 150 μm.

Verification Result 5

FIGS. 15A through 15D are diagrams showing light flux states of signal light at a position away from the photodetector 114 in the direction toward the anamorphic lens 110 by a predetermined distance. FIGS. 15A through 15D respectively show simulation results, wherein the distances from the photodetector 114 are set to 2 mm, 1.5 mm, 1 mm, and 0 mm (on the photodetector 114).

The positions (0 to 2 mm) in FIGS. 15A through 15C are each a position range capable of setting the wavelength plate 111. Specifically, FIGS. 15A through 15C each shows a light flux state at a position between the focal line position (M11) of reflection light from a farther layer by convergence in D1 direction, and the focal line position (S2) of reflection light (signal light) from a targeted layer by convergence in D2 direction. The light flux states shown in FIGS. 15A through 15D are each a light flux state of a total light flux after transmitting through an aperture 108.

Referring to FIG. 15A, a position away from the photodetector 114 by 2 mm is in the vicinity of a limit position capable of setting the wavelength plate 111. Specifically, the line 0, the line 1, and the line 2 in FIG. 15A correspond to the boundaries between the four polarization setting areas on the wavelength plate 111 shown in FIGS. 12A and 12B. In this case, the extension of each of the beams of signal light is substantially proximal to one of the lines 0 through 2. Accordingly, if the wavelength plate 111 is disposed closer to the anamorphic lens 110 than the above position, each of the beams may be expanded in a superimposed state over the lines 0 through 2. In a worse case, each of the beams maybe partially and superimposedly entered into the adjacent polarization setting area. As a result, a part of signal light is blocked by the polarizer 112, and is not entered into the photodetector 114. Thus, the light amount of signal light to be entered into the photodetector 114 maybe reduced, which may deteriorate the precision of various signals. In view of the above, it is desirable to dispose the wavelength plate 111 at such a position within 2 mm from the photodetector 114 in the above simulation condition.

The positions shown in FIGS. 15B and 15C are closer to the photodetector 114 than the position shown in FIG. 15A. Accordingly, as compared with the case shown in FIG. 15A, in FIGS. 15B and 15C, the interval between the beams is increased, and the size of each of the beams is reduced. The position (on the photodetector 114) shown in FIG. 15D is a convergence position (S0) of reflection light (signal light) from the targeted layer. Accordingly, each of the beams has a circular shape, as shown in FIG. 15D.

As described above, in the above simulation condition, as far as the wavelength plate 111 is disposed at a position away from the photodetector 114 by 1 to 2 mm, the polarization state of each of the beams of signal light is properly divided into two polarization states by the corresponding boundary between the respective adjacent polarization setting areas on the wavelength plate 111. This enables to properly set polarization states with respect to signal light, as shown in FIGS. 12A and 12B.

Modification Example 1

In Example 2, a case is described, wherein the wavelength plate 111 is disposed at such a position that three beams are entered with a certain interval from each other. In the present modification example, a case is described, wherein a wavelength plate 111 is disposed at such a position that three beams are entered substantially in a superimposed state.

FIG. 16A is diagrams showing a polarization state at each of the positions. As shown in FIG. 16A, reflection light from a targeted layer, a farther layer, and a closer layer is substantially superimposed one over the other on the wavelength plate 111, and converted into SP-polarized light after transmitting through the wavelength plate 111.

Concerning the polarization state at the time of incidence into a polarizer 112, the beams of reflection light from each of the targeted layer, the farther layer, and the closer layer are entered in a state that the interval between the adjacent beams is increased. Further, each of the beams of reflection light has the same polarization state as shown in FIG. 3A.

As shown in FIG. 16A, three circular-shaped transmitting polarization surfaces having a PS-polarization state are formed on the polarizer 112 in a direction along which a track image is formed. In the case where reflection light whose polarization state is set by the wavelength plate 111 is entered into the polarizer 112 having the above arrangement, reflection light (signal light) from the targeted layer is entered into a photodetector 114 through the polarizer 112, because the reflection light is PS-polarized light. On the other hand, as shown in FIG. 16A, reflection light (stray light) from the farther layer and the closer layer is entered into the photodetector 114, with a light flux in the vicinity of the center of each of the beams of stray light being blocked by the polarizer 112, because the reflection light is SP-polarized light. As a result, an area (a signal light area) for guiding only a main beam and two sub beams of signal light is formed on the photodetector 114.

FIG. 16B is a diagram showing a sensor pattern on the photodetector 114. As shown in FIG. 16B, in the present modification example, sensing portions S01 through S04 for receiving a main beam; and sensing portions S11 through S14, and sensing portions S21 through S24 for receiving sub beams are formed in such a manner that the sensing portions are located in a signal light area. Accordingly, as shown in FIG. 16B, each of the sensing portions is allowed to receive only the signal light. Thus, the arrangement enables to obtain various signals having high precision by the photodetector 114.

Modification Example 2

In Modification Example 1, three circular-shaped transmitting polarization surfaces are formed on the polarizer 112. In the present modification example, a single transmitting polarization surface having two transmitting polarization areas is formed on a polarizer 112.

Figure 17A:
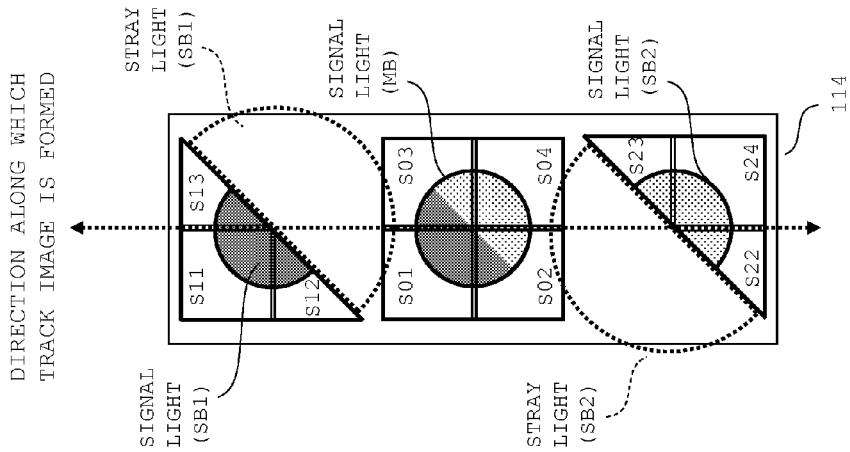
FIGS. 17A and 17B are diagrams showing polarization states and a sensor pattern in Modification Example 2.

Referring to FIG. 17A, a transmitting polarization area on the polarizer 112 is divided into two by a straight line parallel to D1 direction. Reflection light from a targeted layer is PS-polarized light at the time of incidence into the polarizer 112. Accordingly, a main beam is transmitted through the polarizer 112, and a sub beam 1 and a sub beam 2 are transmitted only through an upper left P-polarized portion, and a lower right S-polarized portion on the polarizer 112.

On the other hand, reflection light from a farther layer and a closer layer is SP-polarized light at the time of incidence into the polarizer 112. Accordingly, a main beam is blocked by the polarizer 112, and a sub beam 1 and a sub beam 2 are transmitted only through a lower right P-polarized portion, and an upper left S-polarized portion on the polarizer 112.

Figure 17B:
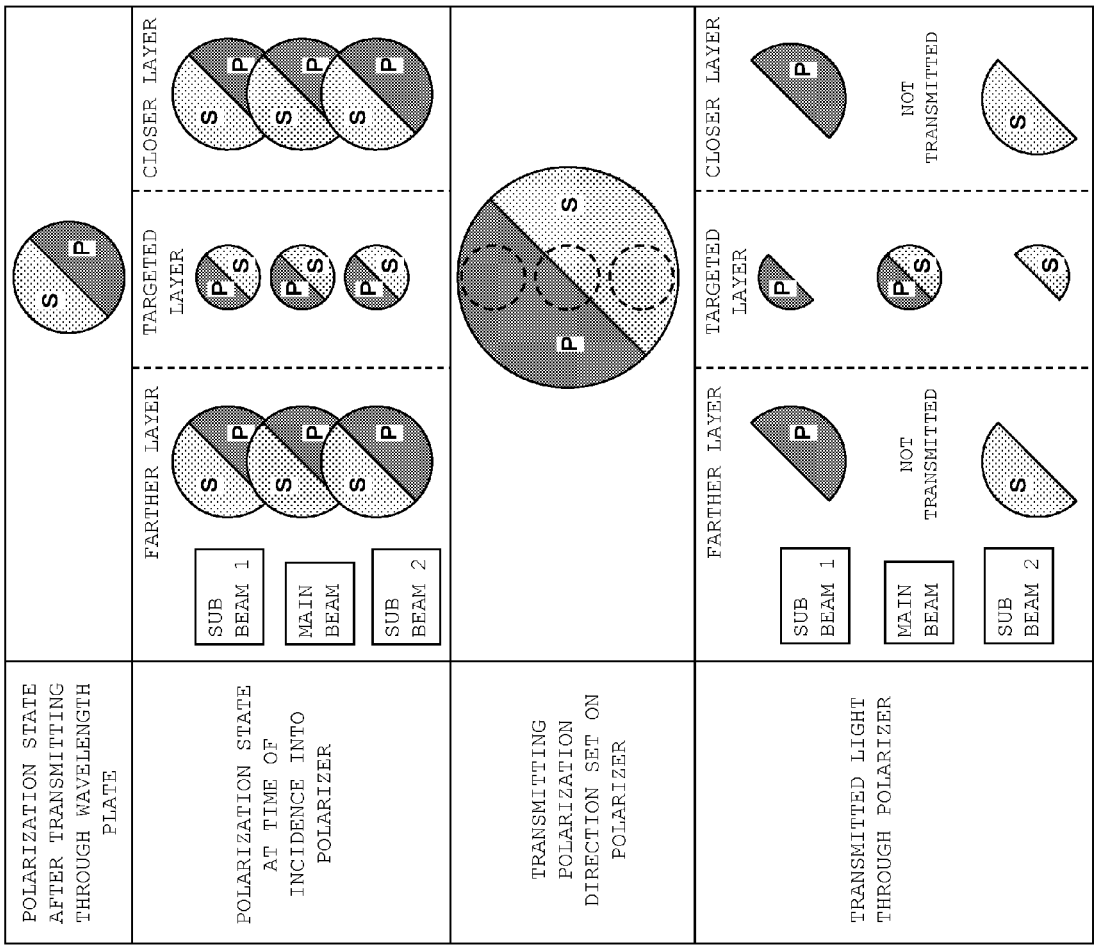

FIG. 17B is a diagram showing a sensor pattern on a photodetector 114. As shown in FIG. 17B, the lower right sensing portion where the sub beam 1 is entered, and the upper left sensing portion where the sub beam 2 is entered are omitted. Accordingly, all the reflection light (signal light) from the targeted layer, which has been transmitted through the polarizer 112, is received by the sensing portion on the photodetector 114. On the other hand, substantially all the reflection light (stray light) from the layers other than the targeted layer is not received by the sensing portion on the photodetector 114, although a part of reflection light (stray light) from the other layers, which has been transmitted through the polarizer 112, is slightly entered into the central sensing portion on the photodetector 114.

In the above arrangement, a computation circuit using a conventional computation method i.e. a DPP (Differential Push Pull) method can be used to generate a tracking error signal; and a computation circuit using a conventional computation method (a differential astigmatism method) can be used to generate a focus error signal. Specifically, in the arrangement shown in FIG. 17B, parts of two sensing portions for receiving sub beams are omitted. The omission, however, does not cause an imbalanced state of a computation signal derived from the sub beams based on signal light SB1 and SB2, except that the magnitude of the computation signal is reduced to one-half of the magnitude of a computation signal to be obtained from a conventional four-division sensor. Accordingly, a tracking error signal and a focus error signal can be properly acquired by setting the magnification of a computation signal derived from sub beams in a computation circuit using the DPP method and the differential astigmatism method to two times compared with that in the conventional arrangement.

Modification Example 2 corresponds to claim 6. The two transmitting polarization areas shown in FIG. 17A correspond to 2 two areas" recited in claim 6.

Modification Example 3

FIGS. 18A and 18B are diagrams showing modification examples of the wavelength plate 111 and the polarizer 112 used in Example 1. FIG. 18A is a diagram showing a modification example of the polarizer 112, and FIG. 18B is a diagram showing a modification example of the wavelength plate 111 to be used in combination with the modification example shown in FIG. 18A.

In the arrangement shown in FIG. 18A, the polarizer 112 has a transmitting area 112a in a central portion thereof. The transmitting area 112a is devoid of a polarizer structure having a predetermined transmitting polarization direction, and has a uniform refractive index in an area from a laser light incident surface to a laser light exit surface thereof. As shown in FIG. 18A, in the present modification example, the transmitting area 112a is a circular area, and there is no boundary in an in-plane direction within the transmitting area 112a. Further, the transmitting area 112a is constituted of e.g. a transparent member, and is designed in such a manner that the optical path length of laser light to be transmitted is identical between the transmitting area 112a and a transmitting polarization area on the polarizer 112 other than the transmitting area 112a.

In the present modification example, each of reflection light to be entered into the transmitting area 112a is transmitted through the polarizer 112. Accordingly, reflection light (stray light) from the layers other than a targeted layer is entered into the central sensing portion on a photodetector 114, as well as reflection light (signal light) from the targeted layer. Accordingly, as compared with Example 1, the detection precision of reflection light from the targeted layer is deteriorated in the present modification example.

However, each of reflection light to be entered into the transmitting area 112a of the polarizer 112 is transmitted through the polarizer 112. Accordingly, as compared with Example 1, the present modification example is advantageous in suppressing lowering of the light amount resulting from unwanted diffraction or light blocking at a boundary in the central transmitting polarization area on the polarizer 112. Consequently, the light amount of light to be entered into the photodetector 114 is increased to thereby enhance the detection precision by the photodetector 114.

In the arrangement shown in FIG. 18B, the wavelength plate 111 has a transmitting area 111a in a central portion thereof. In the present modification example, the transmitting area 111a is a uniform transparent area devoid of a structure for wavelength conversion. Alternatively, a polarization setting area for aligning a polarization direction of laser light with one of an S-polarization direction and a P-polarization direction may be formed in the transmitting area 111a. As shown in FIG. 18B, in the present modification example, the transmitting area 111a is a circular area, and there is no boundary in an in-plane direction within the transmitting area 111a. Further, the transmitting area 111a is designed in such a manner that the optical path length of laser light to be transmitted is identical between the transmitting area 111a and a transmitting polarization area on the wavelength plate 111 other than the transmitting area 111a.

In the above arrangement, as shown in FIG. 18B, the central portion of each of reflection light is a portion where a polarization state after transmitting through the wavelength plate 111 is not set. Further, as shown in FIG. 18A, the central portion of each of reflection light where the polarization state is not set is transmitted through the polarizer 112, and entered into the central sensing portion on the photodetector 114. This arrangement also enables to suppress lowering of the light amount resulting from unwanted diffraction or light blocking at a boundary in the central transmitting polarization area on the wavelength plate 111 to thereby enhance the detection precision by the photodetector 114.

The transmitting areas 111a and 112a shown in FIGS. 18A and 18B correspond to the transmitting portion recited in claims 2 and 3, respectively. However, the transmitting portions recited in claims 2 and 3 are not limited to the transmitting areas 111a and 112a shown in FIGS. 18A and 18B, but may have any other arrangements, as far as the transmitting portion is capable of eliminating a boundary from a central portion of a laser light incident area, and suppressing lowering of a light amount resulting from unwanted diffraction or light blocking at the boundary.

The examples and the modification examples of the invention have been described as above. The invention, however, is not limited to the aforementioned examples and modification examples, and the embodiment of the invention may be modified in various ways other than the above.

The embodiment of the invention may be changed or modified in various ways as necessary, as far as such changes and modifications do not depart from the scope of the claims of the invention hereinafter defined.

What is claimed is:

1. An optical pickup device for recording and/or reproducing information with respect to a disc having recording layers in a laminated direction, the optical pickup device comprising:
    a laser light source;
    an objective lens for conversing laser light emitted from the laser light source onto the disc;
    an astigmatism element for conversing the laser light reflected on the disc in a first direction to form a first focal line at a first position, and conversing the laser light in a second direction to form a second focal line at a second position closer to the disc than the first position;
    a polarization setting element for making polarization directions of light flux portions different from each other, the light flux portions being obtained by dividing a light flux of the laser light transmitted through the astigmatism element into two by a straight line parallel to the first direction;
    a polarizer for receiving the laser light transmitted through the polarization setting element, and which allowing light to transmit therethrough, the light having polarization directions obtained by inverting the polarization directions set by the polarization setting element with respect to the straight line; and
    a photodetector for receiving the laser light transmitted through the polarizer, wherein
    the polarization setting element is disposed between the second focal line of the laser light reflected on a targeted recording layer of the disc, and the first focal line of the laser light reflected on a recording layer farther than the target recording layer, and the polarizer is disposed between the first focal line and the second focal line of the laser light reflected on the targeted recording layer.

2. The optical pickup device according to claim 1, wherein the polarizer has a transmitting portion in a center of an incident area of the laser light thereof, the transmitting portion being devoid of a polarizer structure extending in an optical axis direction of the laser light.

3. The optical pickup device according to claim 2, wherein the polarization setting element has a transmitting portion in a center of an incident area of the laser light thereof, the transmitting portion extending in an optical axis direction of the laser light.

4. The optical pickup device according to claim 1, further comprising
    a diffraction grating for separating the laser light into a main beam and two sub beams, wherein
    the polarization setting element and the polarizer are disposed at such positions that optical axes of the main beam and the sub beams are separated from each other to be operable with respect to each of the main beam and the sub beams.

5. The optical pickup device according to claim 1, further comprising
    a diffraction grating for separating the laser light into a main beam and two sub beams, wherein
    the polarization setting element is disposed at such a position that optical axes of the main beam and the sub beams are substantially superimposed one over the other, and
    the polarizer is disposed at such a position that the optical axes of the main beam and the sub beams are separated from each other to be operable with respect to each of the main beam and the sub beams.

6. The optical pickup device according to claim 1, further comprising
    a diffraction grating for separating the laser light into a main beam and two sub beams, wherein
    the polarization setting element is disposed at such a position that optical axes of the main beam and the sub beams are substantially superimposed one over the other,
    the polarizer is divided into two areas so that transmitting polarization directions in the two areas are made different from each other with respect to a parting line parallel to the first direction, and
    the polarizer is disposed at such a position that a light flux of the main beam is divided into two light flux portions by the parting line, and the main beam and the sub beams are covered by an area formed by combining the two areas of the polarizer.

* * * * *

UNITED STATES PATENT AND TRADEMARK OFFICE
CERTIFICATE OF CORRECTION

PATENT NO. : 8,054,733 B2
APPLICATION NO. : 12/708071
DATED : November 8, 2011
INVENTOR(S) : Kenji Nagatomi Page 1 of 2

It is certified that error appears in the above-identified patent and that said Letters Patent is hereby corrected as shown below:

In the drawings, FIGS. 7A and 7B, remove the legends along the lower axes of the graphs in FIGS. 7A and 7B and insert the legends within the boundary of the graphs:

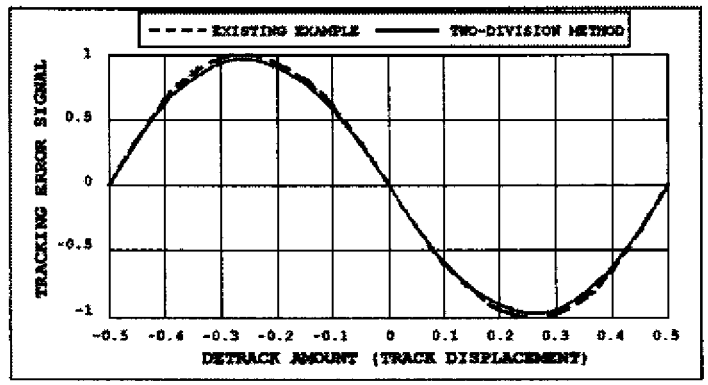

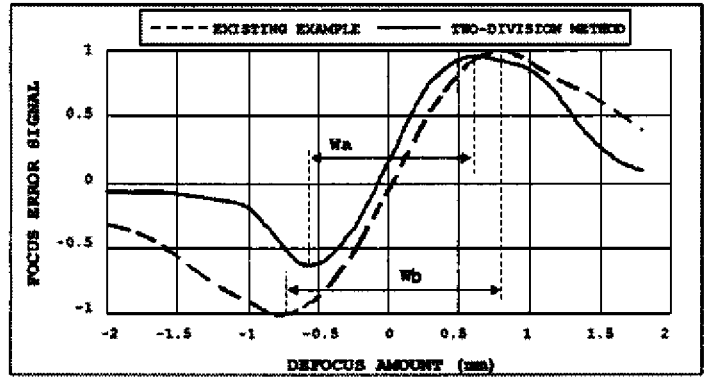

Signed and Sealed this
Fourth Day of December, 2012

David J. Kappos
*Director of the United States Patent and Trademark Office*

CERTIFICATE OF CORRECTION (continued)

U.S. Pat. No. 8,054,733 B2

In the drawings, FIG. 11, remove the Japanese characters in the upper right and insert the English translation of "DISC":

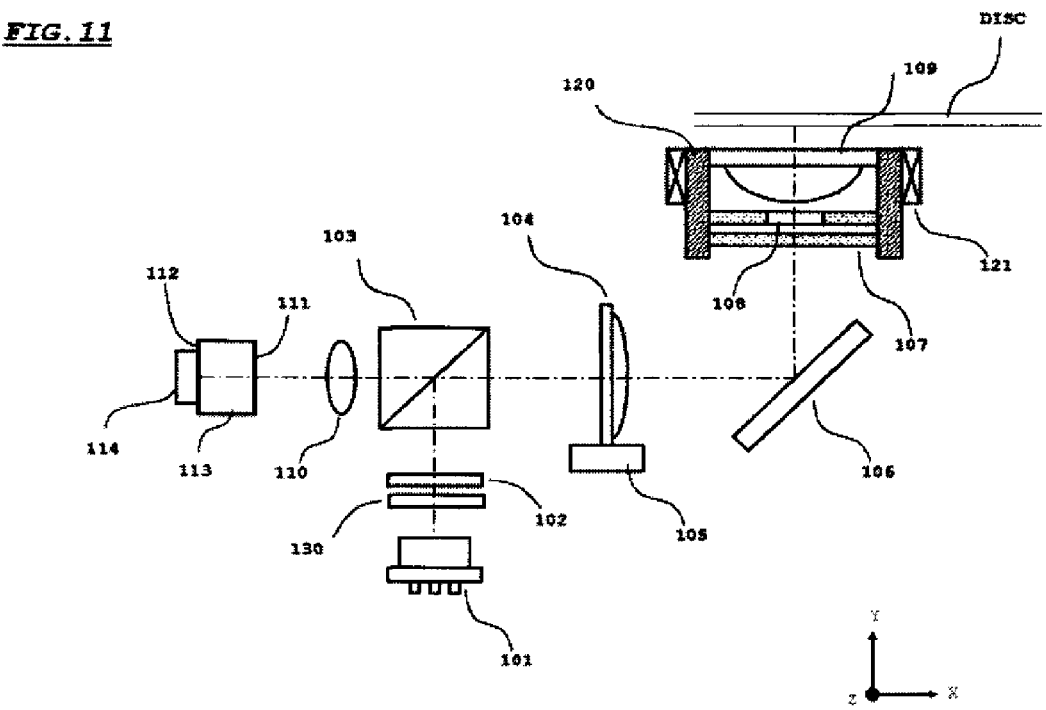

In the drawings, FIG. 18A, remove the Japanese characters in the lower right box and insert the English translation of "BOUNDARY":